(12) United States Patent
Zaliasl et al.

(10) Patent No.: US 11,146,175 B2
(45) Date of Patent: Oct. 12, 2021

(54) ONE-SIDED PARALLEL LLC POWER CONVERTER

(71) Applicant: Ferric Inc., New York, NY (US)

(72) Inventors: Samira Zaliasl, Jersey City, NJ (US); Noah Sturcken, New York, NY (US); Denis Shishkov, Brooklyn, NY (US); Michael Lekas, Brooklyn, NY (US)

(73) Assignee: Ferric Inc., New York, NY (US)

( * ) Notice: Subject to any disclaimer, the term of this patent is extended or adjusted under 35 U.S.C. 154(b) by 0 days.

(21) Appl. No.: 16/800,276

(22) Filed: Feb. 25, 2020

(65) Prior Publication Data
US 2021/0265915 A1  Aug. 26, 2021

(51) Int. Cl.
*H02M 3/335* (2006.01)
*H02M 1/08* (2006.01)
(Continued)

(52) U.S. Cl.
CPC ....... *H02M 3/33569* (2013.01); *H02M 1/083* (2013.01); *H02M 3/01* (2021.05); *H02M 3/33576* (2013.01); *H02M 1/0058* (2021.05)

(58) Field of Classification Search
CPC ......... H02M 2001/0058; H02M 3/335; H02M 3/3353; H02M 3/33569; H02M 3/33576;
(Continued)

(56) References Cited

U.S. PATENT DOCUMENTS

| 4,249,261 A | * | 2/1981 | Ogita | H03G 3/345 |
| | | | | 455/206 |
| 2006/0139970 A1 | * | 6/2006 | Cheng | H02M 3/3372 |
| | | | | 363/24 |

(Continued)

FOREIGN PATENT DOCUMENTS

| CN | 105262343 A | 1/2016 |
| CN | 106505892 A | 3/2017 |

(Continued)

OTHER PUBLICATIONS

ISA, "International Search Report", PCT/US2020/019650, dated May 22, 2020.
(Continued)

*Primary Examiner* — Gary L Laxton
(74) *Attorney, Agent, or Firm* — Intrinsic Law Corp.

(57) ABSTRACT

A power converter includes a primary circuit and a secondary circuit. The primary circuit includes two primary LC circuits that are in parallel electrically with each other. A first node of each primary LC circuit is electrically coupled to a high-voltage input. A second node of each primary LC circuit is coupled to a respective terminal of a primary inductor that forms a transformer with a secondary inductor in the secondary circuit. Each primary LC circuit is electrically coupled to a primary switch that operates at approximately the resonance frequency of the primary LC circuits to output an alternating current that passes through the primary inductor. The terminals of the secondary inductor are coupled to respective secondary switches. The switches operate at the resonance frequency of the primary LC circuit to rectify the power. A low-pass filter outputs the mean of the received voltage.

31 Claims, 14 Drawing Sheets

(51) Int. Cl.
*H02M 3/00* (2006.01)
*H02M 1/00* (2006.01)

(58) Field of Classification Search
CPC .. H02M 3/337; H02M 3/3372; H02M 3/3376; H02M 3/33578; H02M 3/01
See application file for complete search history.

(56) References Cited

U.S. PATENT DOCUMENTS

| | | |
|---|---|---|
| 2009/0231887 A1 | 9/2009 | Ye et al. |
| 2011/0261590 A1* | 10/2011 | Liu .................... H02M 3/3378 363/17 |
| 2015/0381057 A1* | 12/2015 | Luu ...................... H02M 3/337 363/21.01 |
| 2018/0191168 A1 | 7/2018 | Banaska et al. |
| 2019/0044447 A1 | 2/2019 | Wang et al. |
| 2019/0068068 A1 | 2/2019 | Liu et al. |
| 2019/0068069 A1* | 2/2019 | Sheng ............... H02M 3/33576 |

FOREIGN PATENT DOCUMENTS

| | | |
|---|---|---|
| CN | 108274096 A | 7/2018 |
| CN | 109600048 A | 4/2019 |
| TW | 201601437 A | 1/2016 |

OTHER PUBLICATIONS

N. A. Sturcken, "Integrated Voltage Regulators with Thin-Film Magnetic Power Inductors", 2013, Columbia University.
TIPO, "Office Action", 109122933, dated Apr. 8, 2021.

* cited by examiner

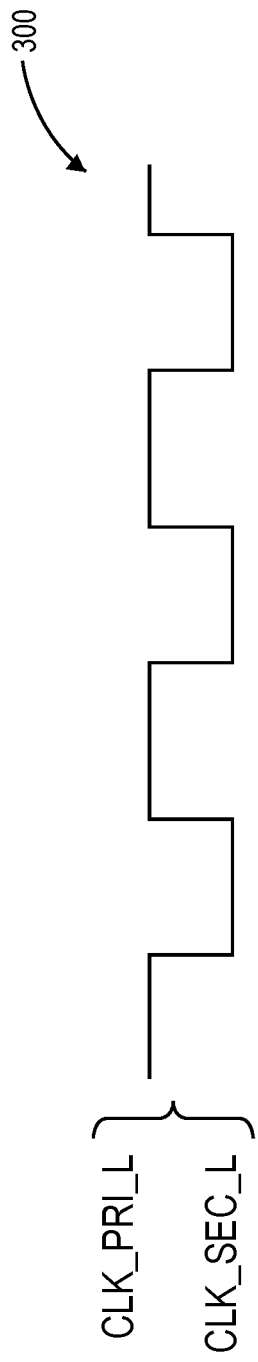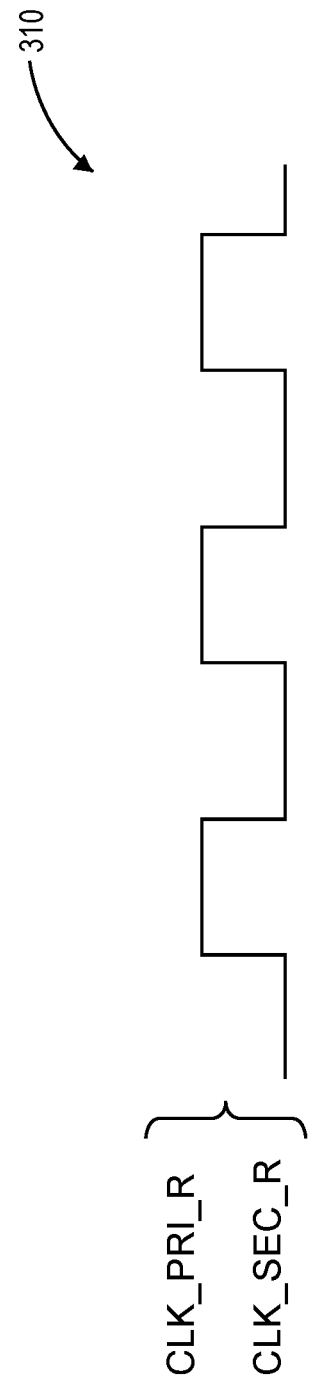

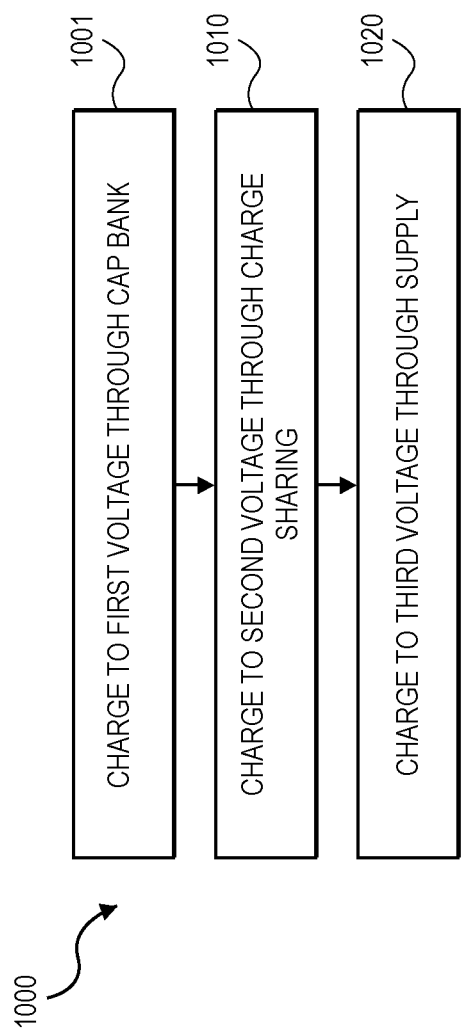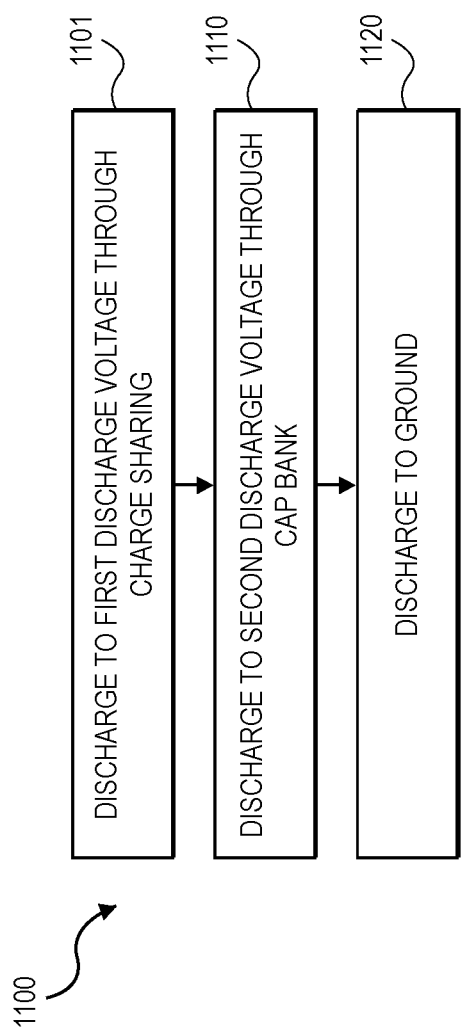

ONE-SIDED PARALLEL LLC POWER CONVERTER

STATEMENT REGARDING FEDERALLY-SPONSORED RESEARCH

This invention was made with government support under Grant No. HR0011-18-3-0011 awarded by the Defense Advanced Research Projects Agency. The government has certain rights in the invention.

TECHNICAL FIELD

This application relates generally to power converters for electronic devices.

BACKGROUND

For today's ubiquitous usage of cloud computing, internet of things (IoT), and big data, growth of data centers is inevitable. Traditionally, the voltage conversions for such devices were conducted in two steps of 48V to 12V and then 12V to 1V.

Conventional switch-mode power converters are used in a large set of electrical power conversion applications (AC-AC, AC-DC, DC-DC, high voltage, low voltage, etc.). These converters generally operate on the principle of using switches to periodically charge an energy reservoir (such as an inductor or capacitor) and then periodically discharge the energy reservoir in a manner that creates an electrical potential at the converter output that is different than the electrical potential supplied to the input of the power converter. Generally, it is attractive to reduce the amount of power that is expended in the conversion process to reduce the total cost of operation (electricity cost).

Using conventional switched-mode power converters in data centers, which require 48V to 1V power conversions, are not practical or efficient as new design challenges are imposed for these converters. The three main limiting factors of conventional switched-mode power converters for high-voltage (HV) conversion are (1) they have an extremely short on-duty time, (2) they are subjected to HV stress which can induce reliability issues, and (3) they need to be low figure-of-merit (FoM) devices such as BCD (Bipolar CMOS-DMOS) devices. Plus, in practice, they can only achieve poor efficiency, as the driver voltage on the high side needs to be level shifted to very high voltage (48V). This also adds complexity to the design.

It would be desirable to overcome these and/or other deficiencies in the art.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a power converter comprising: a primary circuit comprising: a common node electrically coupled to a high-voltage source; a first primary LC circuit electrically coupled to the common node and to a first primary node; a second primary LC circuit electrically coupled to the common node and to a second primary node, the second primary LC circuit in parallel electrically with the first primary LC circuit, the first and second primary LC circuits having the same or about the same primary LC resonance frequency; a primary inductor having a first terminal electrically coupled to the first primary node and a second terminal electrically coupled to the second primary node; a first primary circuit switch electrically coupled to the first primary node, the first primary circuit switch having a closed state where the first primary switch is electrically coupled to the first primary node and to ground, the first primary circuit switch having an open state where the first primary circuit switch is electrically decoupled from the first primary node; and a second primary circuit switch electrically coupled to the second primary node, the second primary circuit switch having a closed state where the second primary switch is electrically coupled to the second primary node and to ground, the second primary circuit switch having an open state where the second primary circuit switch is electrically decoupled from the second primary node. The power converter further comprises a secondary circuit in electrical communication with the primary circuit, the secondary circuit comprising: a secondary inductor electromagnetically coupled to the primary inductor to form a transformer; a first secondary circuit switch electrically coupled to a first secondary inductor node, the first secondary node electrically coupled to a first terminal of the secondary inductor, the first secondary circuit switch having a closed state where the first secondary switch is electrically coupled to the first secondary node and to ground, the first secondary circuit switch having an open state where the first secondary circuit switch is electrically decoupled from the first secondary node; a second secondary circuit switch electrically coupled to a second secondary inductor node, the second secondary node electrically coupled to a second terminal of the secondary inductor, the second secondary circuit switch having a closed state where the second secondary switch is electrically coupled to the second secondary node and to ground, the second secondary circuit switch having an open state where the second secondary circuit switch is electrically decoupled from the second secondary node; and a low-pass filter electrically coupled to the first and second secondary nodes; a low-voltage output node electrically coupled to an output of the low-pass filter; and a controller in electrical communication with the first and second primary circuit switches and with the first and second secondary circuit switches, the controller configured to: operate the first and second primary circuit switches at about the primary LC resonance frequency; and operate the first and second secondary circuit switches at about the primary LC resonance frequency.

In one or more embodiments, the controller includes a frequency-locked loop circuit that is locked to the primary LC resonance frequency. In one or more embodiments, the low-pass filter comprises: a first low-pass filter electrically coupled to the low-voltage output node and the first secondary node; and a second low-pass filter electrically coupled to the low-voltage output node and the second secondary node. In one or more embodiments, the first low-pass filter comprises a first LP inductor and a common output capacitor, and the second low-pass filter comprises a second LP inductor and the common output capacitor. In one or more embodiments, the first and second low-pass filters output a mean of a voltage at the first and second secondary nodes, respectively.

In one or more embodiments, the first and second primary LC circuits output an alternating current, the alternating current passing through the primary circuit inductor. In one or more embodiments, the alternating current is received by the secondary circuit via the transformer. In one or more embodiments, the first and second secondary switches rectify the alternating current.

In one or more embodiments, the controller includes a charge-sharing circuit that is electrically coupled to a charge-sharing switch, the charge-sharing switch electrically coupled to the first and second secondary circuit switches. In one or more embodiments, the charge-sharing circuit is configured to close the charge-sharing switch to form an electrical path between the first and second secondary circuit switches, and when the charge-sharing switch is closed, a charge in a parasitic gate capacitor of the first secondary circuit switch is used to partially charge a parasitic gate capacitor of the second secondary circuit switch.

In one or more embodiments, the power converter further comprises a secondary circuit capacitor in parallel electrically with the secondary inductor to form a secondary LC circuit. In one or more embodiments, the secondary circuit capacitor comprises a variable capacitor. In one or more embodiments, the controller includes a voltage regulation circuit that compares an output voltage at the low-voltage output node with a reference voltage, the voltage regulation circuit increases a capacitance of the variable capacitor when the output voltage is greater than the reference voltage, and the voltage regulation circuit decreases a capacitance of the variable capacitor when the output voltage is less than the reference voltage. In one or more embodiments, the controller includes a primary zero-voltage switching circuit that adjusts a duty cycle of the first and second primary circuit switches so that the first and second primary circuit switches are in phase with the first and second secondary circuit switches, respectively, when the capacitance of the variable capacitor is adjusted;

In one or more embodiments, the controller is configured to operate the first and second primary circuit switches at about a 50% duty cycle. In one or more embodiments, the controller is configured to operate the first and second secondary circuit switches at about the 50% duty cycle.

Another aspect of the invention is directed to a power converter comprising: a primary circuit comprising: a common node electrically coupled to a high-voltage source; a first primary resonant energy-storage device electrically coupled to the common node and to a first primary node; a second primary resonant energy-storage device electrically coupled to the common node and to a second primary node, the second primary resonant energy-storage device in parallel electrically with the first primary resonant energy-storage device, the first and second primary resonant energy-storage devices having the same or about the same primary resonance frequency; a primary inductor having a first terminal electrically coupled to the first primary node and a second terminal electrically coupled to the second primary node; a first primary circuit switch electrically coupled to the first primary node, the first primary circuit switch having a closed state where the first primary switch is electrically coupled to the first primary node and to ground, the first primary circuit switch having an open state where the first primary circuit switch is electrically decoupled from the first primary node; and a second primary circuit switch electrically coupled to the second primary node, the second primary circuit switch having a closed state where the second primary switch is electrically coupled to the second primary node and to ground, the second primary circuit switch having an open state where the second primary circuit switch is electrically decoupled from the second primary node. The power converter further comprises a secondary circuit in electrical communication with the primary circuit, the secondary circuit comprising: a secondary inductor electromagnetically coupled to the primary inductor to form a transformer; a first secondary circuit switch electrically coupled to a first secondary node, the first secondary node electrically coupled to a first terminal of the secondary inductor, the first secondary circuit switch having a closed state where the first secondary switch is electrically coupled to the first secondary node and to ground, the first secondary circuit switch having an open state where the first secondary circuit switch is electrically decoupled from the first secondary node; a second secondary circuit switch electrically coupled to a second secondary node, the second secondary node electrically coupled to a second terminal of the secondary inductor, the second secondary circuit switch having a closed state where the second secondary switch is electrically coupled to the second secondary node and to ground, the second secondary circuit switch having an open state where the second secondary circuit switch is electrically decoupled from the second secondary node; and a low-pass filter electrically coupled to the first and second secondary nodes; a low-voltage output node electrically coupled to the first and second secondary nodes; and a controller in electrical communication with the first and second primary circuit switches and with the first and second secondary circuit switches, the controller configured to: operate the first and second primary circuit switches at about the primary LC resonance frequency; and operate the first and second secondary circuit switches at about the primary LC resonance frequency.

Yet another aspect of the invention is directed a method of converting power, comprising: alternately passing current from a high-voltage source through a first primary energy-storage device and a second primary energy-storage device that is in parallel electrically with the first primary energy-storage device, the first and second energy-storage devices disposed in a primary circuit; passing an output current of the first and second primary energy-storage devices through a primary circuit inductor, the output current having an alternating current; reducing a voltage of the output current in a transformer, the transformer comprising the primary circuit inductor and a secondary circuit inductor that are electromagnetically coupled to each other, the secondary circuit inductor disposed in a secondary circuit; generating a secondary circuit current in the secondary circuit inductor; rectifying the secondary circuit current using first and second secondary switches that are coupled to respective first and second secondary terminals of the secondary circuit inductor; and passing the rectified secondary circuit current through a low-pass filter.

In one or more embodiments, the low-pass filter outputs a mean of a voltage at the first and second secondary terminals. In one or more embodiments the method further comprises changing a state of first and second primary switches to alternately pass the current through the first primary energy-storage device and the second primary energy-storage device, the first and second primary switches electrically coupled to first and second primary nodes, respectively, the first and second primary nodes disposed between the first and second primary energy-storage devices and respective first and second primary terminals of the primary circuit inductor. In one or more embodiments the method further comprises operating the first and second primary switches at a resonance frequency of the first and second primary energy-storage devices. In one or more embodiments the method further comprises operating the first and second primary switches at a resonance frequency of the first and second primary energy-storage devices and at about a 50% duty cycle, the first and second primary switches being substantially out of phase with each other. In one or more embodiments the method further comprises the first and second primary energy-storage devices comprise respective LC circuits.

BRIEF DESCRIPTION OF THE DRAWINGS

For a fuller understanding of the nature and advantages of the present concepts, reference is made to the following detailed description of preferred embodiments and in connection with the accompanying drawings.

FIG. 2A illustrates an example of a control signal for the left primary and secondary switches in FIG. 1.

FIG. 2B illustrates an example of a control signal for the right primary and secondary switches in FIG. 1.

FIG. 10 is a flow chart of a method for charging a parasitic gate capacitor of a switch according to an embodiment.

FIG. 11 is a flow chart of a method for discharging a parasitic gate capacitor of a switch according to an embodiment.

DETAILED DESCRIPTION

A one-sided parallel LLC (PLLC) power converter introduces new power conversion topologies suitable for very high voltage ratios ($V_{IN}/V_{OUT}$). It comprises two primary LC tanks (e.g., LC circuits), a transformer, a rectifier, and a low-pass filter. The power converter is configured to have a primary circuit and a secondary circuit that are electrically coupled through a transformer. On the primary side of the transformer, the resonant inductors work with the primary resonant capacitors and respective high-voltage (e.g., GaN) power transistors, creating AC voltage for power transfer across the transformer. The transformer has a high turns ratio to achieve a high step-down ratio with high efficiency. On the secondary side, the inductor from the transformer works with an optional secondary resonant capacitor and two CMOS switches to receive the power and rectify it. A low-pass filter, Lout and Cout, output the mean value of the received voltage. Unlike the classic half-bridge topology, in this architecture there is no need for high-side switches on the rectifier side which makes it possible to achieve higher efficiency with no need to boost the drive voltage for the high-side switches. The voltage across these transistors can be controlled and good FoM power-FETs can be used.

To control the timing between the primary and secondary circuits and between the left and right phases of each circuit, a controller (e.g., an ASIC) is used. This controller can have up to three independent control loops that can provide zero-voltage switching (ZVS) on the primary and/or secondary side and can also dynamically control the timing between primary and secondary sides to keep them synchronized.

Figure 1:
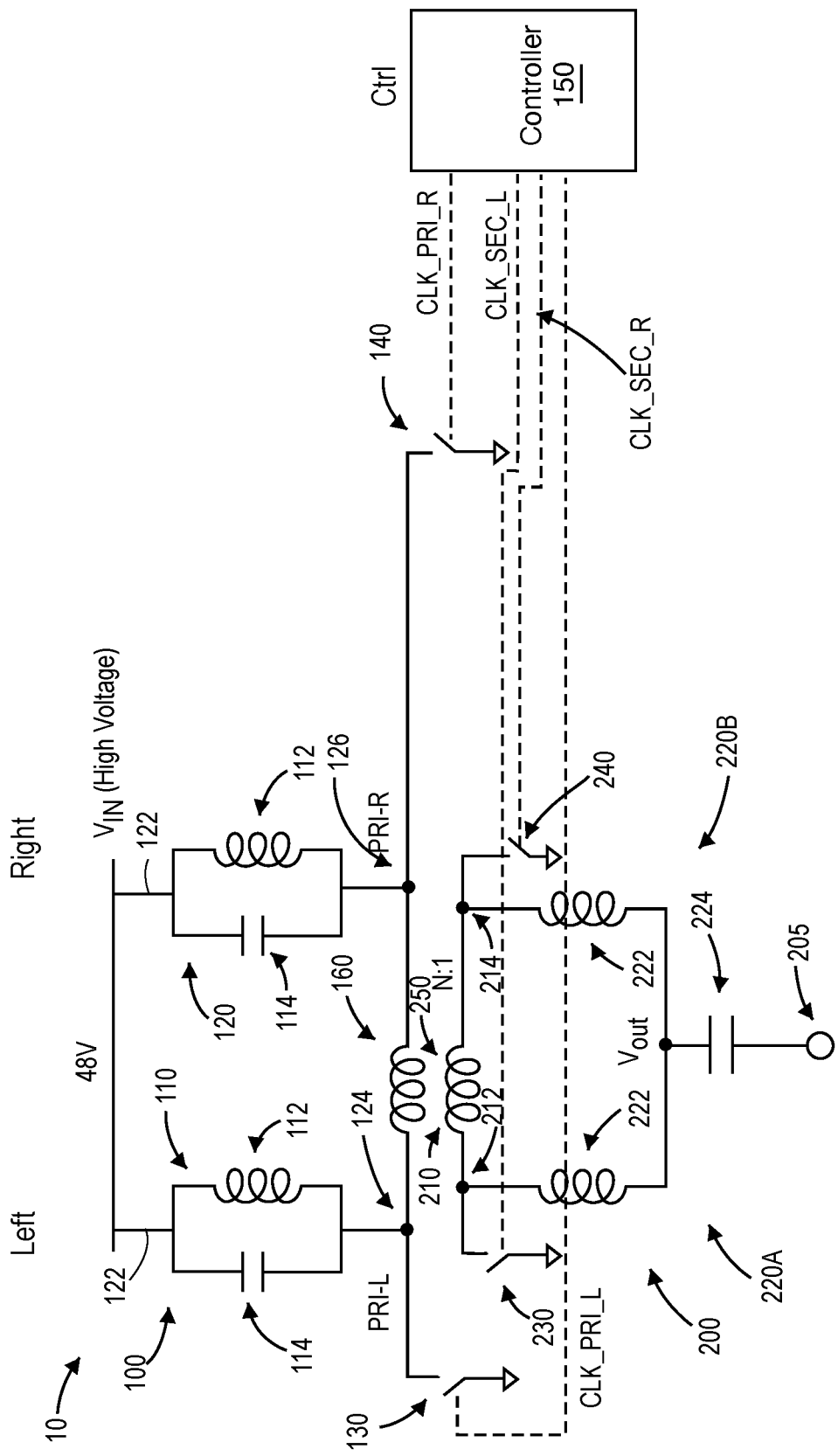
FIG. 1 is a schematic circuit diagram of a PLLC power converter according to an embodiment.

FIG. 1 is a schematic circuit diagram of a PLLC power converter 10 according to an embodiment. The PLLC power converter 10 includes a primary power converter circuit 100 and a secondary power converter circuit 200 that are in electrical communication with each other.

The primary power converter circuit 100 includes left and right primary LC circuits 110, 120 that are in parallel electrically with each other. The left and right primary LC circuits 110, 120 can alternately be referred to as first and second primary LC circuits, respectively. Each primary LC circuit 110, 120 includes an inductor 112 and a capacitor 114 that are in parallel electrically with each other. Each primary LC circuit 110, 120 can function as a primary resonant tank. A first side 122 of each primary LC circuit 110, 120 is electrically coupled to a high-voltage (HV) input $V_{IN}$. $V_{IN}$ can be within a high-voltage range of 12V to 60V, including 24V and/or 48V. In other embodiments, $V_{IN}$ can be less than 12V or greater than 60V.

In another embodiment, each primary LC circuit 110, 120 can be replaced with another resonant energy storage device.

Each primary LC circuit 110, 120 is configured to have the same LC resonance frequency. For example, each inductor 112 can be configured to have the same inductance. Likewise, each capacitor 114 can be configured to have the same capacitance.

It is noted that the primary LC circuits 110, 120 are illustrated in simplified form. In other embodiments, one or both primary LC circuits 110, 120 can include multiple capacitors and/or multiple inductors (e.g., electrically in parallel and/or in series with each other). Each capacitor can be the same as or different than the other capacitors. Likewise, each inductor can be the same as or different than the other inductors. In addition or in the alternative, the primary LC circuits 110, 120 can include additional passive electrical components such as resistors. However, it is noted that the primary LC circuits 110, 120 have the same or about the same LC resonance frequencies regardless of their configuration. As used herein, "about" means plus or minus 10% of the relevant value.

The primary power converter circuit 100 further includes left and right primary switches 130, 140, respectively. The left and right primary switches 130, 140 can alternately be referred to as first and second primary circuit switches, respectively. Each primary switch 130, 140 has a first state where the respective switch is electrically coupled to ground and a second state where the respective switch is open. The left and right primary switches 130, 140 are controlled, via control signals generated by controller 150, such that when the left primary switch 130 is closed, the right primary switch 140 is open, and when the right primary switch 140 is closed, the left primary switch 130 is open. The control signals for each primary switch 130, 140 have the same frequency. During the "on" time, the respective secondary switch 230, 240 is open. During the "off" time, the respective secondary switch 230, 240 is closed. The frequency of the control signals for the left and right primary switches 130, 140 is about the same as the LC resonance frequency of the primary LC circuits 110, 120.

When the left primary switch 130 is open and the right primary switch 140 is closed, the energy stored in the left primary LC circuit 110 is discharged as current that passes through a primary circuit inductor 160 towards the ground connection at the right primary switch 140. The right primary LC circuit 120 is charged while the right primary switch 140 is closed. Similarly, when the right primary switch 140 is open and the left primary switch 130 is closed, the energy stored in the right primary LC circuit 120 is discharged as current that passes through the primary circuit inductor 160 towards the ground connection at the left primary switch 130. The left primary LC circuit 110 is charged while the left primary switch 130 is closed. The state of the primary switches 130, 140 is controlled by the controller 150 as further described herein. In some embodiments, the primary switches 130, 140 can be or can comprise gallium nitride transistors.

The primary power converter circuit 100 can have a first primary energy-storage circuit that is formed by the left primary LC circuit 110 and the left primary switch 130. The primary power converter circuit 100 can also have a second primary energy-storage circuit that is formed by the second primary LC circuit 120 and the right primary switch 140.

The secondary power converter circuit 200 includes a secondary circuit inductor 210, left and right low-pass filters 220A, 220B, and left and right secondary switches 230, 240. The left and right secondary switches 230, 240 can alternately be referred to as first and second secondary circuit switches, respectively. The primary and secondary circuit Inductors 160, 210 form a transformer 250 having an N:1 turns ratio where the primary circuit inductor 160 has a higher number of windings than the secondary circuit inductor 210 to step down the voltage across the transformer 250. For example, the turns ratio can be about 2:1 to about 50:1 in some embodiments, including about 5:1, about 10:1, about 15:1, about 20:1, about 25:1, about 30:1, about 35:1, about 40:1, about 45:1, or any turns ratio or range of turns ratios between any two of the foregoing turns ratios.

Each of the left and right secondary switches 230, 240 has a first state where the respective switch is electrically coupled to ground and a second state where the respective switch is open. When the left secondary switch 230 is closed, the right secondary switch 240 is open, and when the right secondary switch 240 is closed, the left secondary switch 230 is open. When the left secondary switch 230 is open and the right secondary switch 240 is closed, the energy stored in the secondary circuit inductor 210 is discharged as current that passes through the right low-pass filter 220B to output 205. Similarly, when the right secondary switch 240 is open and the left secondary switch 230 is closed, the energy stored in the secondary circuit inductor 210 is discharged as current that passes through the left low-pass filter 220A to the output 205. The state of the switches 230, 240 is controlled by the controller 150 as further described herein. In some embodiments, the switches 230, 240 can be or can comprise CMOS transistors.

The controller 150 includes drivers that control the state of the left and right primary switches 130, 140 in the primary power converter circuit 100 (e.g., by controlling the drive voltages for each switch 130, 140) and that control the state of the left and right secondary switches 230, 240 in the secondary power converter circuit 200 (e.g., by controlling the drive voltages for each switch 230, 240). The controller 150 can control the left and right primary switches 130, 140 such that their states are completely or almost completely out of phase. For example, when the left primary switch 130 is closed, the right primary switch 140 is open, and when the right primary switch 140 is closed, the left primary switch 130 is open. The controller 150 causes each primary switch 130, 140 to be in the open state at a frequency that equals the LC resonance frequency of the left and right primary LC circuits 110, 120. Each primary switch 130, 140 has a duty cycle, which can be adjusted by the controller 150. In an example embodiment, each primary switch 130, 140 has a 50% duty cycle or about a 50% duty cycle.

The controller 150 can control the left and right secondary switches 230, 240 such that their states are completely or almost completely out of phase. For example, when the left secondary switch 230 is closed, the right secondary switch 240 is open, and when the right secondary switch 240 is closed, the left secondary switch 230 is open. The controller 150 causes each secondary switch 230, 240 to be in the open state at a frequency that equals the LC resonance frequency of the left and right primary LC circuits 110, 120. Each secondary switch 230, 240 has a duty cycle, which can be adjusted by the controller 150. In an example embodiment, each secondary switch has a 50% duty cycle or about a 50% duty cycle.

During the "on" time, the respective secondary switch 230, 240 is open. During the "off" time, the respective secondary switch 230, 240 is closed. The left primary and secondary switches 130, 230 are synchronized and in phase with each other. An example of the control signal 300 generated by the controller 150 for the left primary and secondary switches 130, 230 is illustrated in FIG. 2A. Likewise, the right primary and secondary switches 140, 240 are synchronized and in phase with each other. An example of the control signal 310 generated by the controller 150 for the right primary and secondary switches 140, 240 is illustrated in FIG. 2B.

The synchronized and in-phase switching causes the left primary LC circuit 110 and the left side of the secondary power converter circuit 200 to charge and discharge at the same time (e.g., during the "on" time for the left primary and secondary switches 130, 230). The synchronized and in-phase switching also causes the left primary LC circuit 110 and the left side of the secondary power converter circuit 200 to be grounded and discharged at the same time (e.g., during the "off" time for the left primary and secondary switches 130, 230). Likewise, synchronized and in-phase switching causes the right primary LC circuit 120 and the right side of the secondary power converter circuit 200 to charge and discharge at the same time (e.g., during the "on" time for the right primary and secondary switches 140, 240). The synchronized and in-phase switching also causes the right primary LC circuit 120 and the right side of the secondary power converter circuit 200 to be grounded at the same time (e.g., during the "off" time for the right primary and secondary switches 140, 240).

Figure 3A:
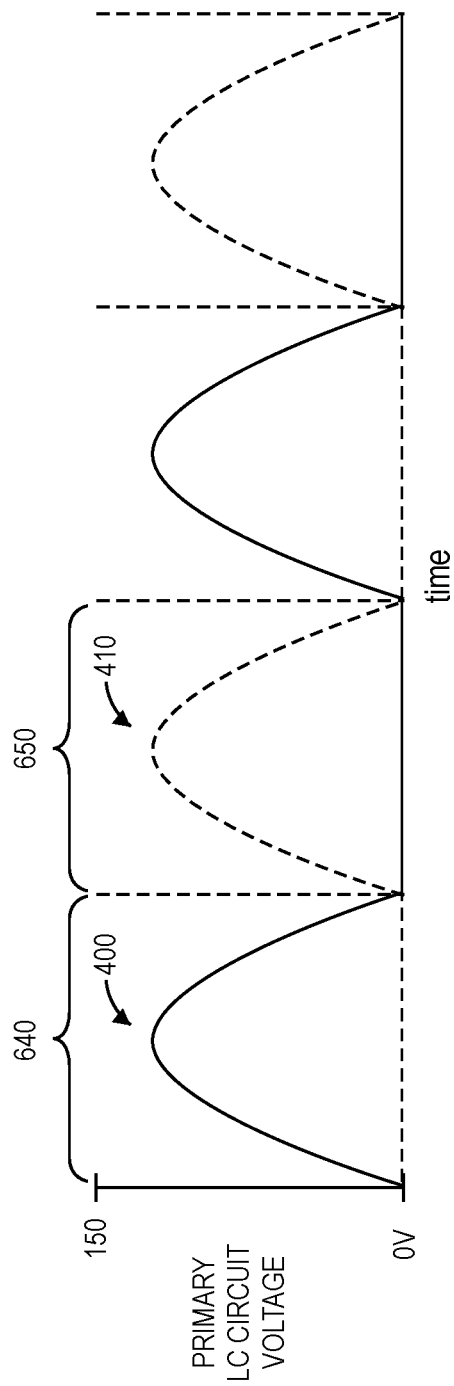
FIG. 3A illustrates waveforms of the voltages across the left and right primary LC circuits in FIG. 1.
Figure 3B:
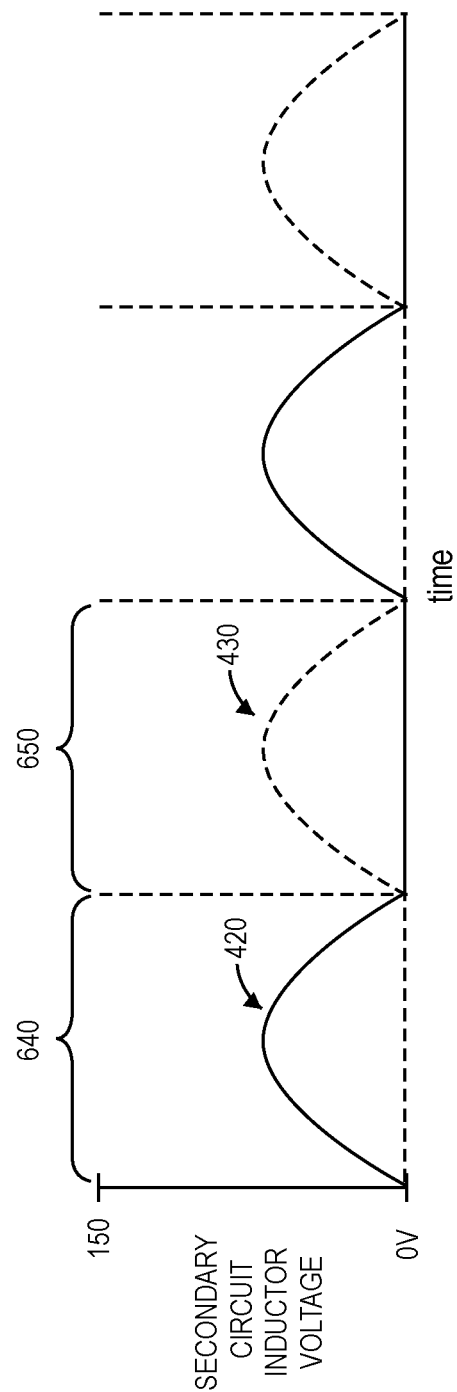
FIG. 3B illustrates waveforms of the voltages at the left and right inductor nodes in FIG. 1.

FIG. 3A illustrates waveforms 400, 410 of the voltages at the left and right primary output nodes 124, 126, respectively (FIG. 1), which are electrically coupled to left and right terminals, respectively of the primary circuit inductor 160. FIG. 3B illustrates waveforms 420, 430 of the voltages at the left and right inductor nodes 212, 214, respectively, which are electrically coupled to left and right terminals, respectively of the secondary circuit inductor 210. As can be seen in FIGS. 3A and 3B, the left primary LC circuit 110 and the left side of the secondary power converter circuit 200 charge and discharge concurrently during phases 640, 650 and the right primary LC circuit 120 and the right side of the secondary power converter circuit 200 charge and discharge concurrently during phases 650, 640. Likewise, the left primary output node 124 and the left inductor node 212 are grounded concurrently and the right primary output node 126 and the right inductor node 214 are grounded concurrently.

In one example, the phases 640, 650 can correspond to first and second portions of a 50% duty cycle with respect to the switching frequency of switches 130, 140, 230, 240. The left and right primary switches 130, 140 can be controlled by different control signals that are completely out of phase with each other. Likewise, the left and right secondary switches 230, 240 can be controlled by different control signals that are completely out of phase with each other. However, in this example, the same left control signals can be used to control the left primary and left secondary switches 130, 230, and the same right control signals can be used to control the right primary and right secondary switches 140, 240. The phases 640, 650 can correspond to other duty cycles for example as described herein.

As illustrated in FIG. 3A, at the beginning and end of each phase 640, 650, the voltage difference between the left and right primary output nodes 124, 126 is zero which provides zero-voltage switching for the left and right primary switches 130, 140. In addition, as illustrated in FIG. 3B, at the beginning and end of each phase 640, 650, the voltage difference between the left and right inductor nodes 212, 214 is zero which provides zero-voltage switching for the left and right secondary switches 230, 240.

It is noted that the current that flows from the HV input through the first or second primary LC circuit 110, 120, and through the primary circuit inductor 160 travels in different directions (depending on whether the current travelled through the first or second primary LC circuit 110, 120) to create an alternating current (AC) through the primary circuit inductor 160. The AC power is received in the secondary circuit 200 via the transformer 250 and rectified by the left and right secondary switches 230, 240.

Each low-pass filter 220A, 220B includes a separate inductor 222 and a common output capacitor 224. In other embodiments, each low-pass filter 220A, 220B has a separate output capacitor. The low-pass filters 220A 200B output the mean value of the voltages at the first and second inductor nodes 212, 214, respectively. For example, the mean value of the voltages at the first and second inductor nodes 212, 214 can be about 0.8V to about 1.5V in some embodiments including any voltage or voltage range therebetween.

Figure 4:
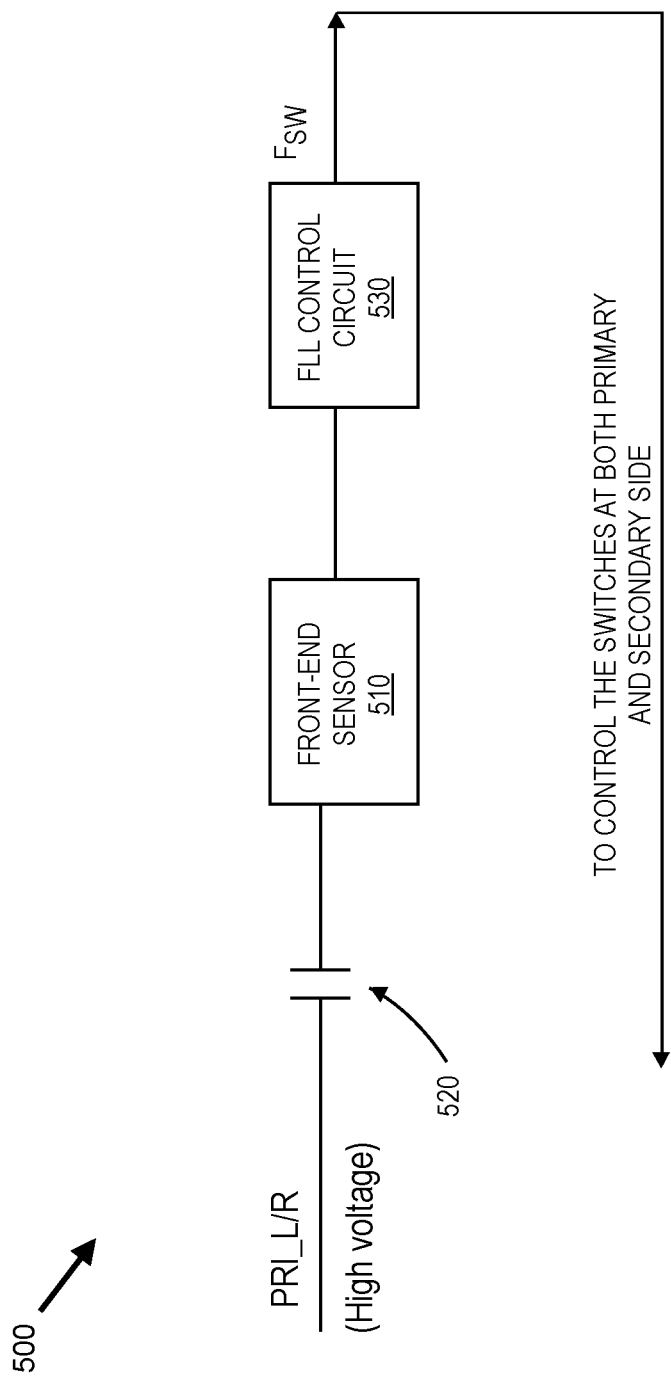
FIG. 4 is a schematic diagram of a control circuit for controlling the switching frequency of the primary and second switches in FIG. 1.

FIG. 4 is a schematic diagram of an example control circuit 500 for controlling the switching frequency of the primary and second switches 130, 140, 230, 240 to achieve ZVS. The control circuit 500 can be disposed in the controller 150. The control circuit 500 includes a front-end sensor 510 that is AC-coupled to the first and second primary output nodes 124, 126 (e.g., PRI_L and PRI_R in FIG. 1) via a respective coupling capacitor 520. The front-end sensor 510 outputs the frequency of the PRI_L AC voltage and the frequency of the PRI_R AC voltage. These frequencies are input to a frequency-locked loop (FLL) control circuit 530 that is locked to the LC resonance frequency of the first and second LC circuits 110, 120. The output of the FLL control circuit 530 are control signals $F_{SW}$ and $\overline{F_{SW}}$ that have a frequency and that matches the LC resonance frequency of the first and second LC circuits 110, 120. The $F_{SW}$ and $\overline{F_{SW}}$ control signals have mostly complementary 50% duty cycles (e.g., when $F_{SW}$ is "on," $\overline{F_{SW}}$ is "off" and vice versa). The $F_{SW}$ control signal can be used to control the left primary and secondary switches 130, 230. The $\overline{F_{SW}}$ control signal can be used to control the right primary and secondary switches 140, 240.

Figure 5:
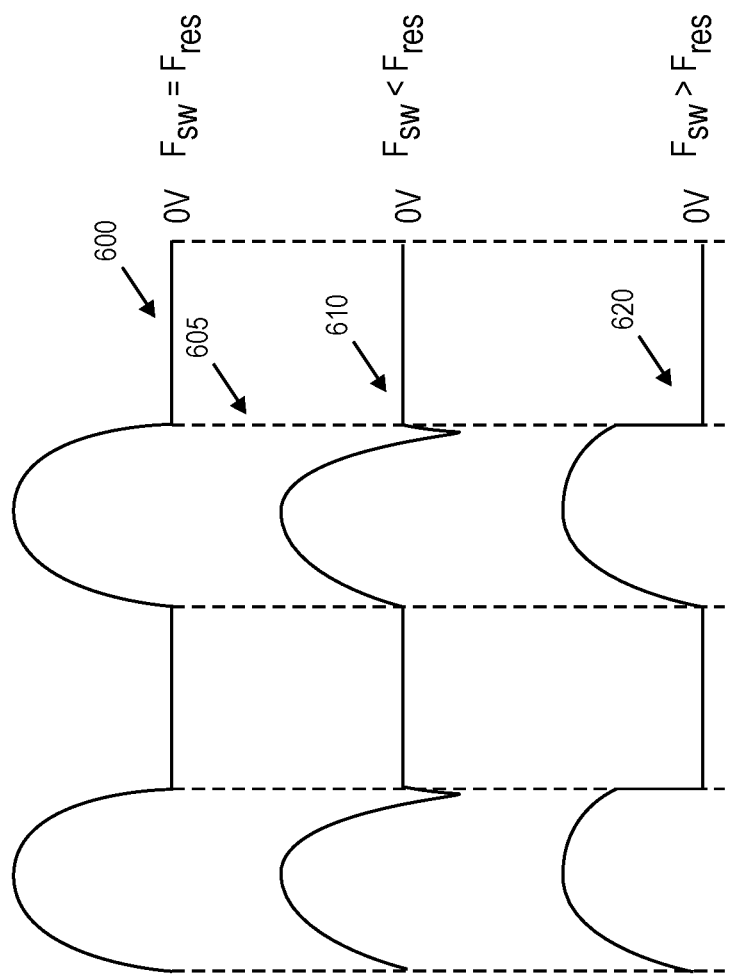
FIG. 5 illustrates waveforms of the voltage across the left primary switch in three different scenarios.

FIG. 5 illustrates waveforms of the voltage at the left primary output node 124 in three different scenarios. Although this figure is described with respect to the left primary output node 124, the description is also applicable for the right primary output node 126. In the first scenario 600, the frequency of the control signal $F_{SW}$ for the left primary switch 130 is equal to the LC resonance frequency $F_{RES}$ of the first and second LC circuits 110, 120. This is the preferred scenario which provides zero-voltage switching because the left primary switch 130 changes state (e.g., at time 605) from open to closed when the voltage at the left primary output node 124 is zero, which is the same voltage at the right primary output node 126 because the right primary switch 140 is closed (grounded) at that time. In the second scenario 610, the frequency of the control signal $F_{SW}$ is less than the LC resonance frequency $F_{RES}$. As can be seen, the voltage at the left primary output node 124 is less than zero when the left primary switch 130 changes state (e.g., at time 605) from open to closed. This is undesirable and does not provide ZVS because this voltage is different (lower in this scenario) than the voltage at the right primary output node 126, which is zero because the right primary switch 140 is closed (grounded) at that time. In the third scenario 620, the frequency of the control signal $F_{SW}$ is greater than the LC resonance frequency $F_{RES}$. As can be seen, the voltage at the left primary output node 124 is greater than zero when the left primary switch 130 changes state (e.g., at time 605) from open to closed. This is undesirable and does not provide zero-voltage switching because this voltage is different (higher in this scenario) than the voltage at the right primary output node 126, which is zero because the right primary switch 140 is closed (grounded) at that time.

The PLLC power converter 10 is described above under ideal conditions. However, in operation the PLLC power converter 10 may deviate from ideal conditions due to manufacturing variances between the primary LC circuits 110, 120 and/or due to non-ideal performance of the transformer 250. For example, when the LC resonance frequencies of the left and right primacy LC circuits 110, 120 are not equal (e.g., due to manufacturing variances between the respective inductors and/or capacitors), the duty cycle of the control signals for the left and/or right primary switches 130, 140 can be adjusted (e.g., increased above 50% or decreased below 50%) to provide zero-voltage switching. In zero-voltage switching, the voltage across the left primary switch 130 is equal to (or in some embodiments approximately equal to (e.g., within 5% or less)) the voltage across the right primary switch 140 when the left and right switches 130, 140 change state to reduce power loss in the primary circuit 100.

Figure 6A:
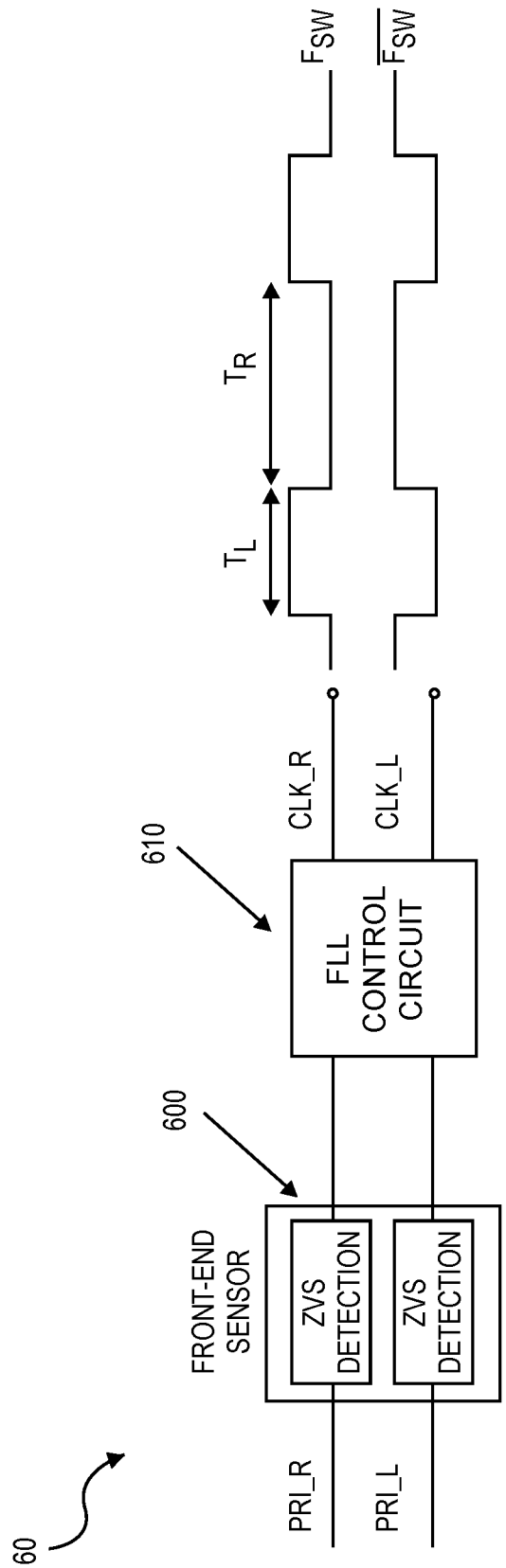
FIG. 6A is a schematic diagram of a control circuit for controlling the duty cycles of the primary and second switches to achieve zero-voltage switching when the LC resonance frequencies of the left and right primacy LC circuits are not equal.

FIG. 6A is a schematic diagram of a zero-voltage control circuit 60 for controlling the duty cycles of the primary and secondary switches 130, 140, 230, 240 to achieve zero-voltage switching when the LC resonance frequencies of the left and right primary LC circuits 110, 120 are not equal. The control circuit 60 includes a front-end sensor 600 that is electrically coupled to the first and second primary output nodes 124, 126 (e.g., PRI_L and PRI_R in FIG. 1). The front-end sensor 600 outputs the PRI_L and PRI_R voltages which are input to an FLL control circuit 610 that is locked to the average resonance frequency of the left and right LC circuits 110, 120 and that has a tunable duty cycle.

The FLL control circuit 610 outputs control signals $F_{SW}$ and $\overline{F_{SW}}$ that have a frequency that matches the average resonance frequency of the left and right LC circuits 110, 120. The FLL control circuit 610 adjusts the duty cycle of the control signals $F_{SW}$ and $\overline{F_{SW}}$ to ensure that zero-voltage switching occurs. The duty cycles are determined according to the following equations:

$$T_L = \frac{1}{2} \times \frac{1}{f_{res\_L}} \quad (1)$$

$$T_R = \frac{1}{2} \times \frac{1}{f_{res\_R}} \quad (2)$$

$$T_L + T_R = \frac{1}{f_{sw}} \quad (3)$$

where $T_L$ is the time that represents a 50% duty cycle of the LC resonance frequency $f_{res\_L}$ of the left LC circuit 110, $T_R$ is the time that represents a 50% duty cycle of the LC resonance frequency $f_{res\_R}$ of the right LC circuit 120, and $T_L+T_R$ is the period of the switching frequency $f_{sw}$ for the left and right LC circuits 110, 120 (i.e., the switching frequency of the control signals $F_{SW}$ and $\overline{F_{SW}}$).

Figure 6B:
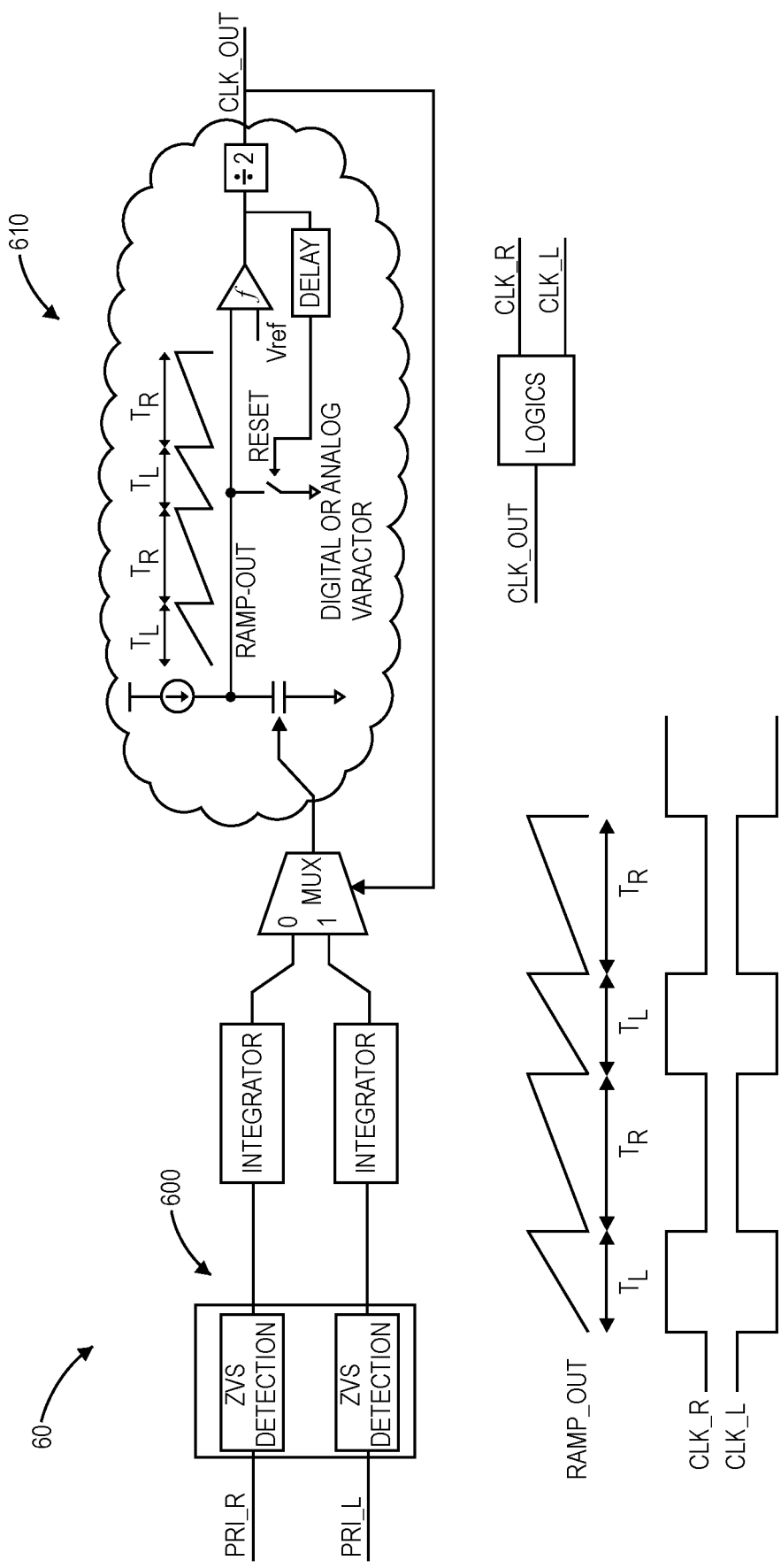
FIG. 6B is an example implementation of the control circuit illustrated in FIG. 6A.

FIG. 6B is an example implementation of the control circuit 60 in simplified block diagram form. The control circuit 60 of FIG. 6B generates a clock signal with a tunable frequency and a tunable duty cycle to match the LC resonance frequencies on the primary side (left and right).

Figure 7A:
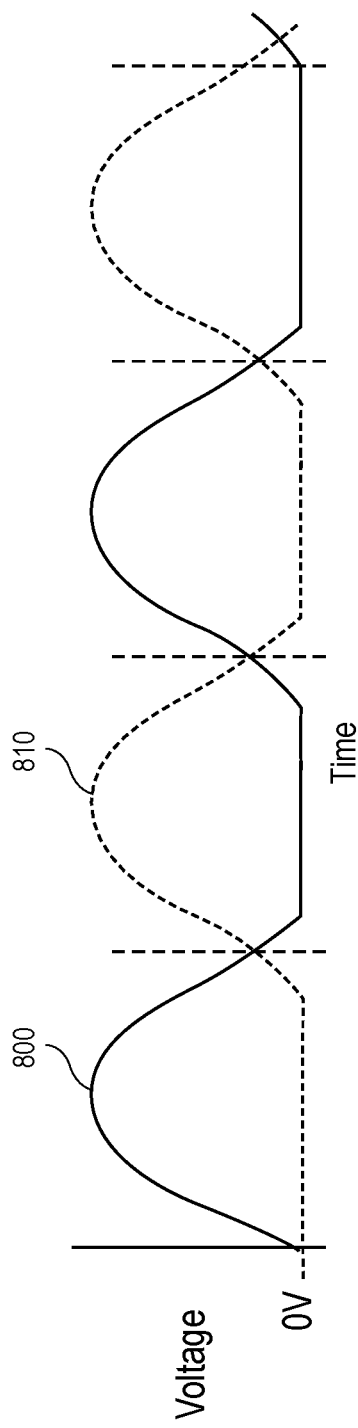
FIG. 7A illustrates waveforms of the voltages across the left and right primary switches where the duty cycle of the left primary switch and the duty cycle of the right primary switch have been increased to achieve zero-voltage switching.
Figure 7B:
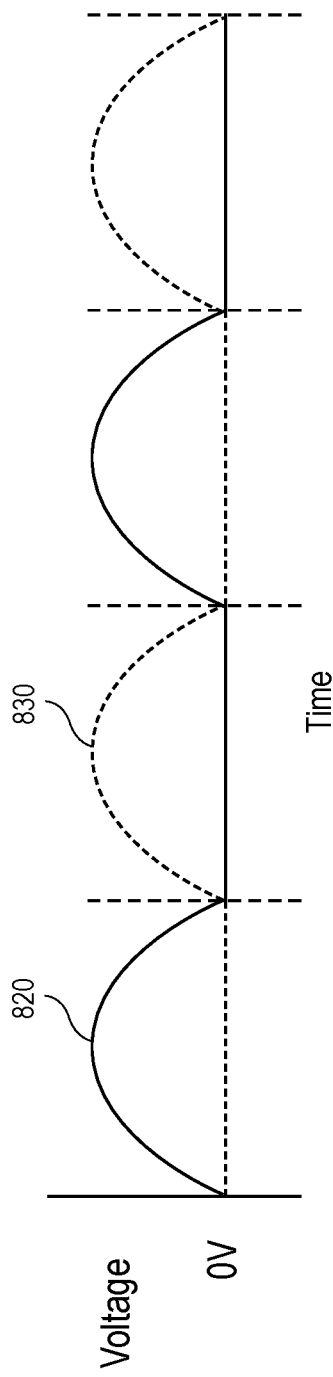
FIG. 7B illustrates waveforms of the corresponding voltages at the left and right inductor nodes where the left and right secondary switches have a 50% duty cycle.

FIG. 7A illustrates waveforms 800, 810 of the voltages at the left and right primary output nodes 124, 126, respectively, where the duty cycle of the left primary switch 130 and the duty cycle of the right primary switch 140 have been increased (e.g., above 50%) to achieve zero-voltage switching. FIG. 7B illustrates waveforms 820, 830 of the corresponding voltages at the left and right inductor nodes 212, 214, respectively, where the left and right secondary switches 230, 240 have a fixed 50% duty cycle. The duty cycles of the left and right primary switches 130, 140 are selected so that left and right primary switches 130, 140 are in phase with the left and right secondary switches 230, 240, respectively.

Figure 8:
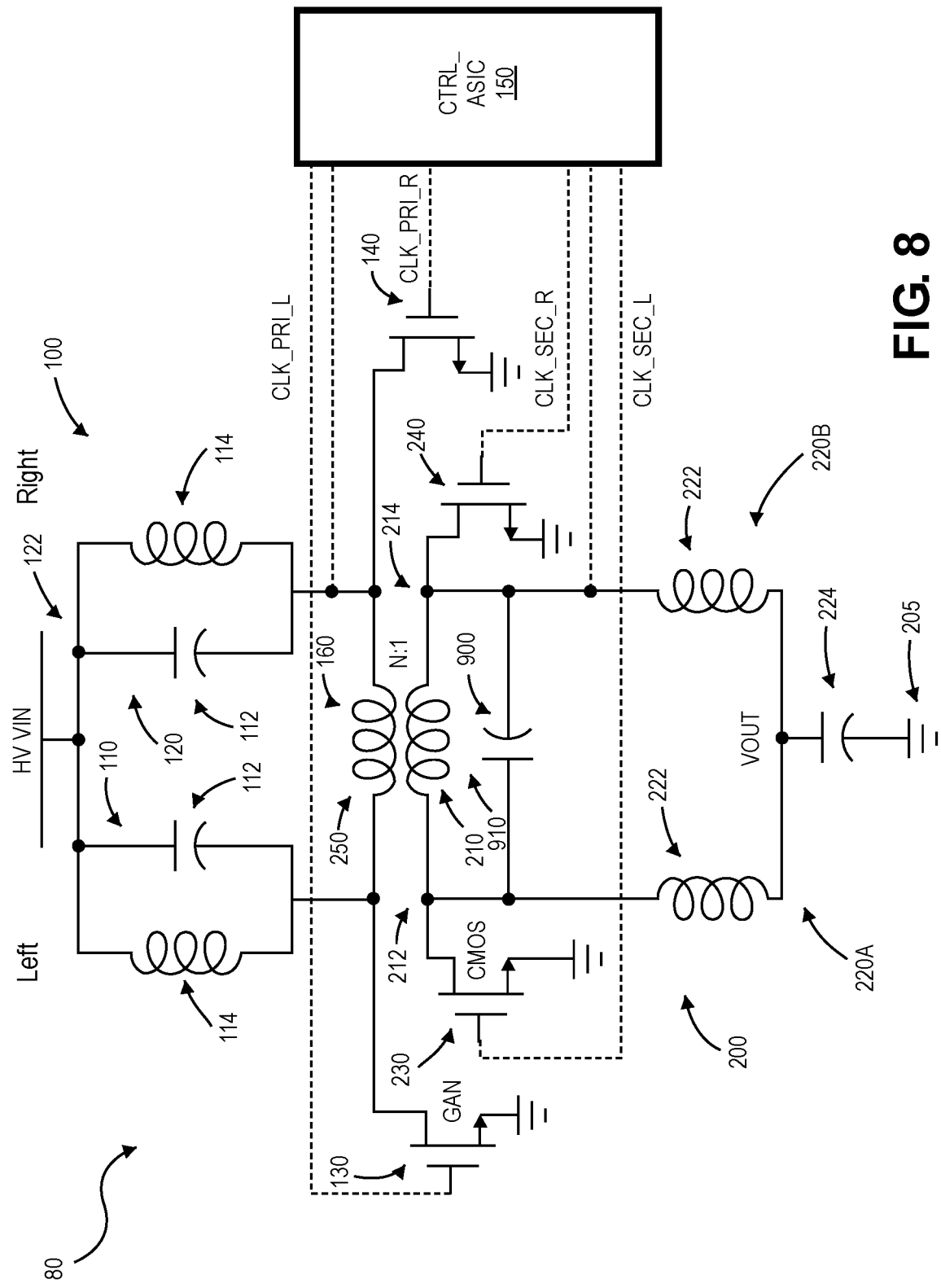
FIG. 8 is a schematic diagram of a PLLC according to an alternative embodiment.

FIG. 8 is a schematic diagram of a PLLC 80 according to an alternative embodiment. PLLC 80 is the same as PLLC 10 except as described herein. The secondary circuit 200 of PLLC 80 includes a secondary circuit capacitor 900 that is in parallel electrically with the secondary circuit inductor 210 to form a secondary LC circuit 910. The secondary LC circuit 910 has an LC resonance frequency that is based on the inductance of the secondary circuit inductor 210 and the capacitance of the secondary circuit capacitor 900. The LC resonance frequency of the secondary LC circuit 910 can be the same as or about the same as the resonance frequency of the left and right primary LC circuits 110, 120.

In non-ideal conditions, the transformer 250 can operate with a coupling coefficient K that is less than 1 where at least some electromagnetic flux is not coupled between (e.g., leaks from) the primary and secondary circuit inductors 160, 210. This leakage can cause high-frequency "ringing" in the secondary circuit 200 that can be damped with snubbers, which can cause power loss. When K values are lower or the primary and secondary circuit inductors 160, 210 have lower inductances, the ringing frequency is lower and harder to damp. However, this lower-frequency ringing can be removed or mitigated by decreasing the impedance of the secondary side 210. The addition of the secondary circuit capacitor 900 lowers the impedance of the secondary side 210 by forming an LC circuit (secondary LC circuit 910).

Figure 9:
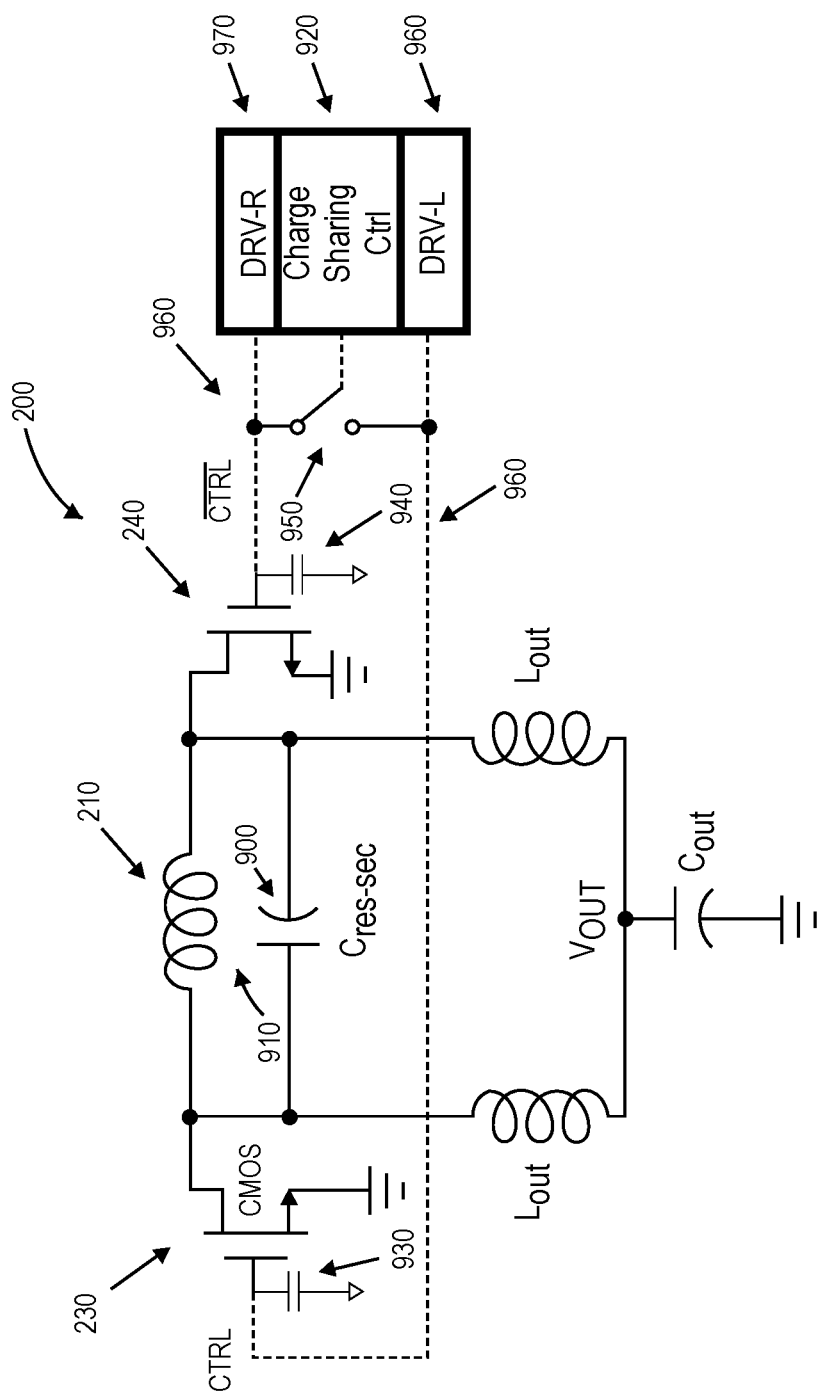
FIG. 9 is a schematic diagram of an embodiment of the secondary circuit with charge sharing between the left and right secondary switches.

FIG. 9 is a schematic diagram of an embodiment of the secondary circuit 200 with charge sharing between the left and right secondary switches 230, 240. The left and right secondary switches 230, 240 are identical (e.g., within manufacturing tolerances) and thus the respective parasitic gate capacitances, represented by left and right parasitic gate capacitors 930, 940, are identical (e.g., within manufacturing tolerances). It is noted that the optional secondary circuit capacitor 900 is illustrated in FIG. 9 but is not required for charge sharing between the left and right secondary switches 230, 240.

The left and right secondary switches 230, 240 are electrically coupled to a charge-sharing switch 950 via conductive lines 960. When the charge-sharing switch 950 is closed, a charge-sharing circuit is formed between the left and right secondary switches 230, 240. The charge-sharing circuit allows at least some of the energy stored in one of the parasitic gate capacitors 930, 940 to partially charge the other parasitic gate capacitor. For example, when the left secondary switch 230 is in the open state, the left parasitic gate capacitor 930 is fully charged and the right parasitic gate capacitor 940 is fully discharged. The left parasitic gate capacitor 930 discharges to transition the left secondary switch 230 from the open state to the closed state. Likewise, the right parasitic gate capacitor 940 charges to transition the right secondary switch 240 from the closed state to the open state. During the transition of the left secondary switch 230 from the open state to the closed state, the charge-sharing switch 950 closes so that at least some of the energy discharged from the left parasitic gate capacitor 930 is used to at least partially charge the right parasitic gate capacitor 940. Likewise, during the transition of the right secondary switch 240 from the open state to the closed state, the charge-sharing switch 950 closes so that at least some of the energy discharged from the right parasitic gate capacitor 940 is used to at least partially charge the left parasitic gate capacitor 930. The charge-sharing switch 950 is controlled by a charge-sharing control circuit 920 in the controller 150. The remainder of the energy to be charged into or discharged from the parasitic gate capacitors 930, 940 to open or close the left and right secondary switches 230, 240 is provided or removed via the left and right switch drivers 960, 970, respectively.

In some embodiments, charge sharing can provide about 25% to about 50% of the charge necessary to charge each parasitic gate capacitor 930, 940.

In some embodiments, charge sharing is possible because the left and right secondary switches 230, 240 are fully out of phase with each other and the parasitic gate capacitances, represented by parasitic gate capacitors 930, 940, of the left and right secondary switches 230, 240, respectively, are identical (e.g., within manufacturing tolerances).

In some embodiments the controller 150 can at least partially charge the parasitic gate capacitors 930, 940 using a capacitor bank and/or can partially discharge the parasitic gate capacitors 930, 940 using the capacitor bank. For example, the controller 150 can partially charge each parasitic gate capacitor 930, 940 using the capacitor bank and partially charge each parasitic gate capacitor 930, 940 through charge sharing. Likewise, the controller 150 can partially discharge each parasitic gate capacitor 930, 940 using the capacitor bank and partially discharge each parasitic gate capacitor 930, 940 through charge sharing.

FIG. 10 is a flow chart 1000 of a method for charging a parasitic gate capacitor of a switch according to an embodiment. In step 1001, the parasitic gate capacitor (e.g., parasitic gate capacitor 930, 940) is charged from ground to a first charge voltage through a capacitor bank. The capacitor bank includes a plurality of capacitors that can be charged and discharged to recycle energy. In step 1010, the parasitic gate capacitor is charged from the first charge voltage to a second charge voltage through a charge sharing circuit with another parasitic gate capacitor. For example, the left parasitic gate capacitor 930 can be charged from the first charge voltage to the second charge voltage through charge sharing with the right parasitic gate capacitor 940 (e.g., as discussed above). In step 1020, the parasitic gate capacitor is charged from the second charge voltage to a third charge voltage through an external power supply (e.g., via switch drivers 960, 970). The third charge voltage can correspond to the operating voltage or fully-charged voltage of the parasitic gate capacitor to open the corresponding switch. Steps 1001 and 1010 are examples of power or charge recycling (improved efficiency) while step 1020 is an example of a power or charge loss (inefficiency). Steps 1001 and/or 1010 can be optional in some embodiments.

FIG. 11 is a flow chart 1100 of a method for discharging a parasitic gate capacitor of a switch according to an embodiment. In step 1101, the parasitic gate capacitor is discharged from the operating voltage or a fully-charged voltage to a first discharged voltage through charging sharing with another parasitic gate capacitor. For example, the right parasitic gate capacitor 940 can be discharged from the operating voltage to the first discharge voltage through charge sharing with the left parasitic gate capacitor 930 (e.g., as discussed above). In step 1110, the parasitic gate capacitor is discharged to a second discharge voltage by charging one or more capacitors in a capacitor bank. In step 1120, the parasitic gate capacitor is discharged to ground by electrically coupling the parasitic gate capacitor to ground (e.g., via switch drivers 960, 970). Steps 1101 and 1110 are examples of power or charge recycling (improved efficiency) while step 1120 is an example of a power or charge loss (inefficiency). Steps 1101 and/or 1110 can be optional in some embodiments.

Figure 12:
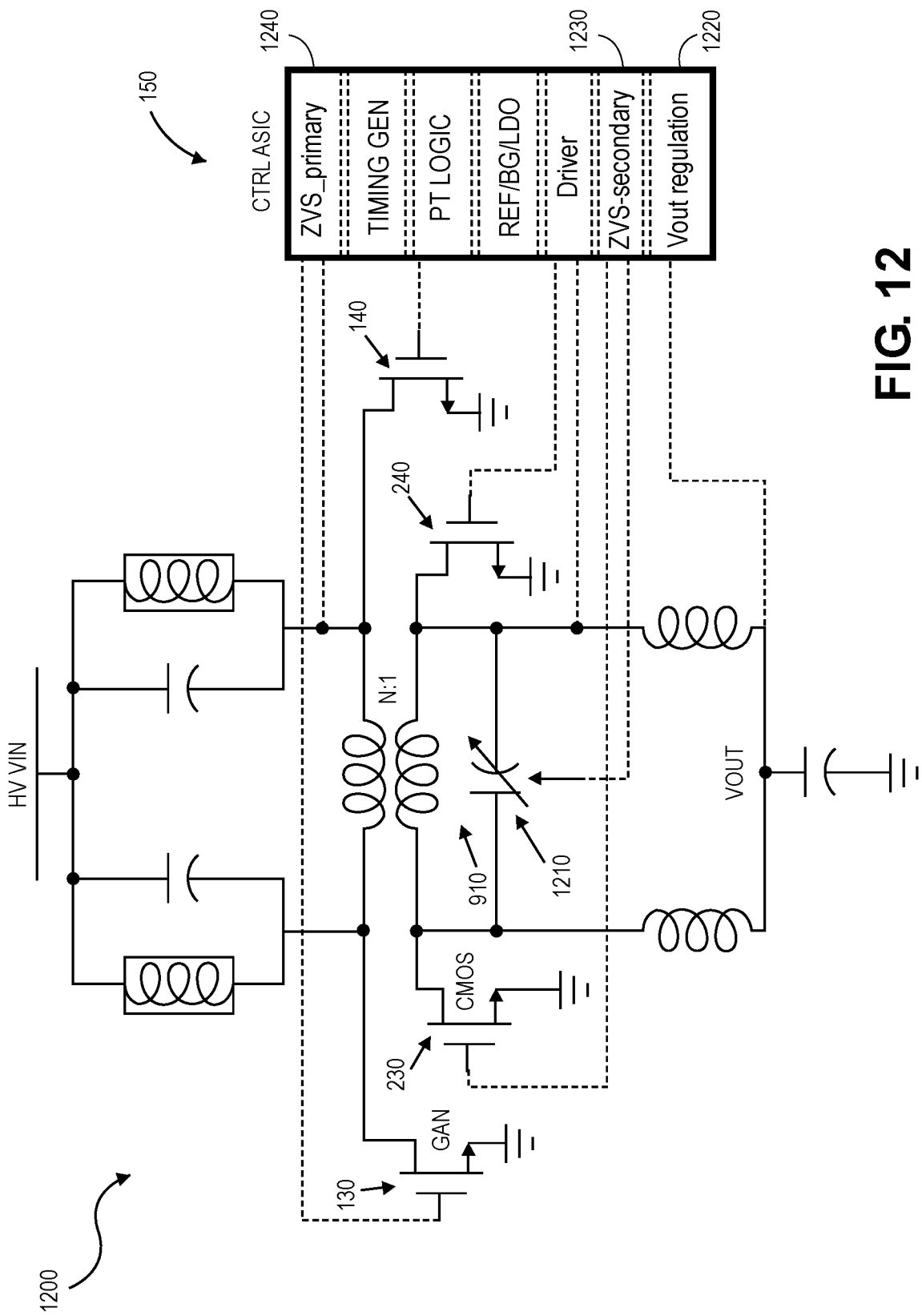
FIG. 12 is a schematic diagram of a PLLC power converter according to an alternative embodiment.

FIG. 12 is a schematic diagram of a PLLC power converter 1200 according to an alternative embodiment. The PLLC power converter 1200 is the same as PLLC power converter 80 except that the PLLC power converter 1200 includes a variable capacitor 1210 in the secondary LC circuit 910 in place of the secondary circuit capacitor 900. The variable capacitor 1210 can be adjusted by the controller 150 to tune the LC resonance frequency of the secondary LC circuit 910. The PLLC power converter 1200 also includes a voltage regulation circuit 1220.

The voltage regulation circuit 1220 compares the output voltage $V_{OUT}$ of the PLLC power converter 1200 with a reference voltage $V_{REF}$. In an embodiment, the voltage regulation circuit 1220 includes a voltage-controlled oscillator having an output that is coupled to an input of a FLL that is locked on the frequency corresponding to $V_{REF}$. When $V_{OUT}$ is greater than $V_{REF}$, the voltage regulation circuit 1220 decreases the capacitance of the variable capacitor 1210 (e.g., via secondary zero-voltage switch circuit 1230). A decrease in the capacitance of the variable capacitor 1210 causes the LC resonance frequency of the secondary LC circuit 910 to increase, which causes a corresponding increase in the switching frequency of the left and right secondary switches 230, 240 (e.g., via secondary zero-voltage switch circuit 1230).

The increase in the switching frequency of the left and right secondary switches 230, 240 causes a corresponding increase in the duty cycles of the left and right primary switches 130, 140 (e.g., via primary zero-voltage switch circuit 1240) to align the phase of the left primary switch 130 with the phase of the left secondary switch 230 and to align the phase of the right primary switch 140 with the phase of the right secondary switch 240 (e.g., by increasing the switching frequency of the left and right primary switches 130, 140). The increased duty cycles of the left and right primary switches 130, 140 increase the switching frequency between the left and right primary switches 130, 140, which reduces the charging time of the left and right primary LC circuits 110, 120 and decreases their peak voltage. The lower peak voltage in the left and right primary LC circuits 110, 120 decreases the output voltage $V_{OUT}$.

In some embodiments, the primary zero-voltage switch circuit 1240 and/or the secondary zero-voltage switch circuit 1230 can be the same as the zero-voltage control circuit 60.

Figure 13:
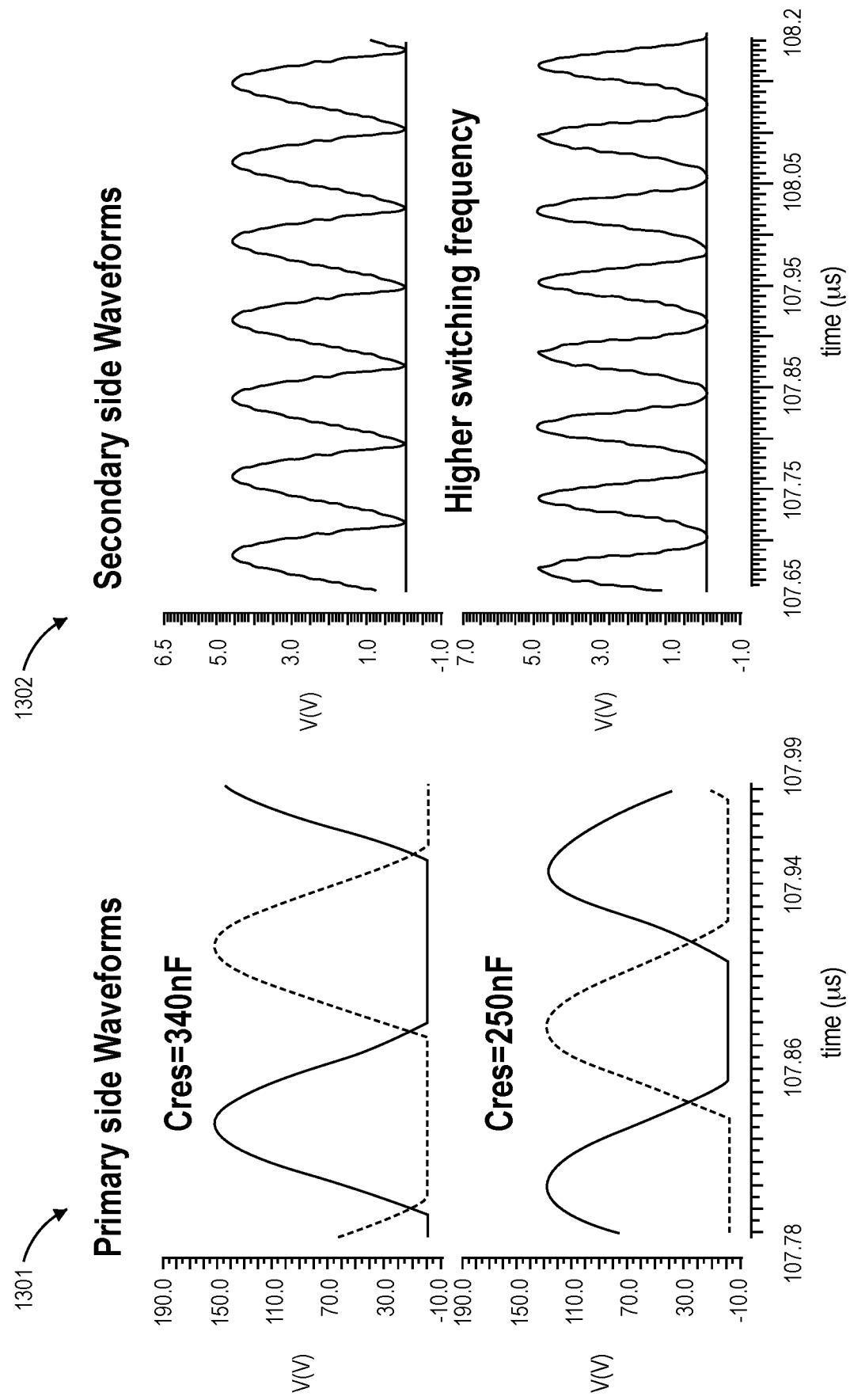
FIG. 13 illustrates a model of primary and secondary circuit waveforms when the variable capacitor has a capacitance of 340 nF and when the variable capacitor has a capacitance of 250 nF.

FIG. 13 illustrates a model of primary and secondary circuit waveforms 1301, 1302, respectively, when the variable capacitor 1210 has a capacitance of 340 nF and when the variable capacitor 1210 has a capacitance of 250 nF. As illustrated in FIG. 13, the secondary circuit has an increased switching frequency when the variable capacitor 1210 has a capacitance of 250 nF compared to when the variable capacitor 1210 has a capacitance of 340 nF. In addition, the primary circuit has a lower peak voltage (e.g., about 130V versus 155V) when the variable capacitor 1210 has a capacitance of 250 nF compared to when the variable capacitor 1210 has a capacitance of 340 nF. It is noted that the capacitances and voltages illustrated in FIG. 13 are provided as examples and are not intended to be limiting. Other capacitances and/or voltages can be provided consistent with this disclosure. As can be seen, decreasing the capacitance of the variable capacitor 1210 causes the peak voltage of the primary circuit to decrease due to higher switching frequency. Likewise, increasing the capacitance of the variable capacitor 1210 causes the peak voltage of the primary circuit to increase due to lower switching frequency.

Returning to FIG. 12, when $V_{OUT}$ is less than $V_{REF}$, the voltage regulation circuit 1220 increases the capacitance of the variable capacitor 1210. An increase in the capacitance of the variable capacitor 1210 causes the LC resonance frequency of the secondary LC circuit 910 to decrease, which causes a corresponding decrease in the switching frequency of the left and right secondary switches 230, 240 (e.g., due to secondary zero-voltage switch circuit 1120). The decrease in the switching frequency of the left and right secondary switches 230, 240 causes a corresponding decrease in the duty cycles of the left and right primary switches 130, 140 to align the phase of the left primary switch 130 with the phase of the left secondary switch 230 and to align the phase of the right primary switch 140 with the phase of the right secondary switch 240. The decreased duty cycles of the left and right primary LC circuits 110, 120 decreases the switching frequency between the left and right primary switches 130, 140, which increases the charging time of the respective left and right primary LC circuits 110, 120 and increases their peak voltage. The higher peak voltage in the left and right primary LC circuits 110, 120 increases the output voltage $V_{OUT}$.

Figure 14:
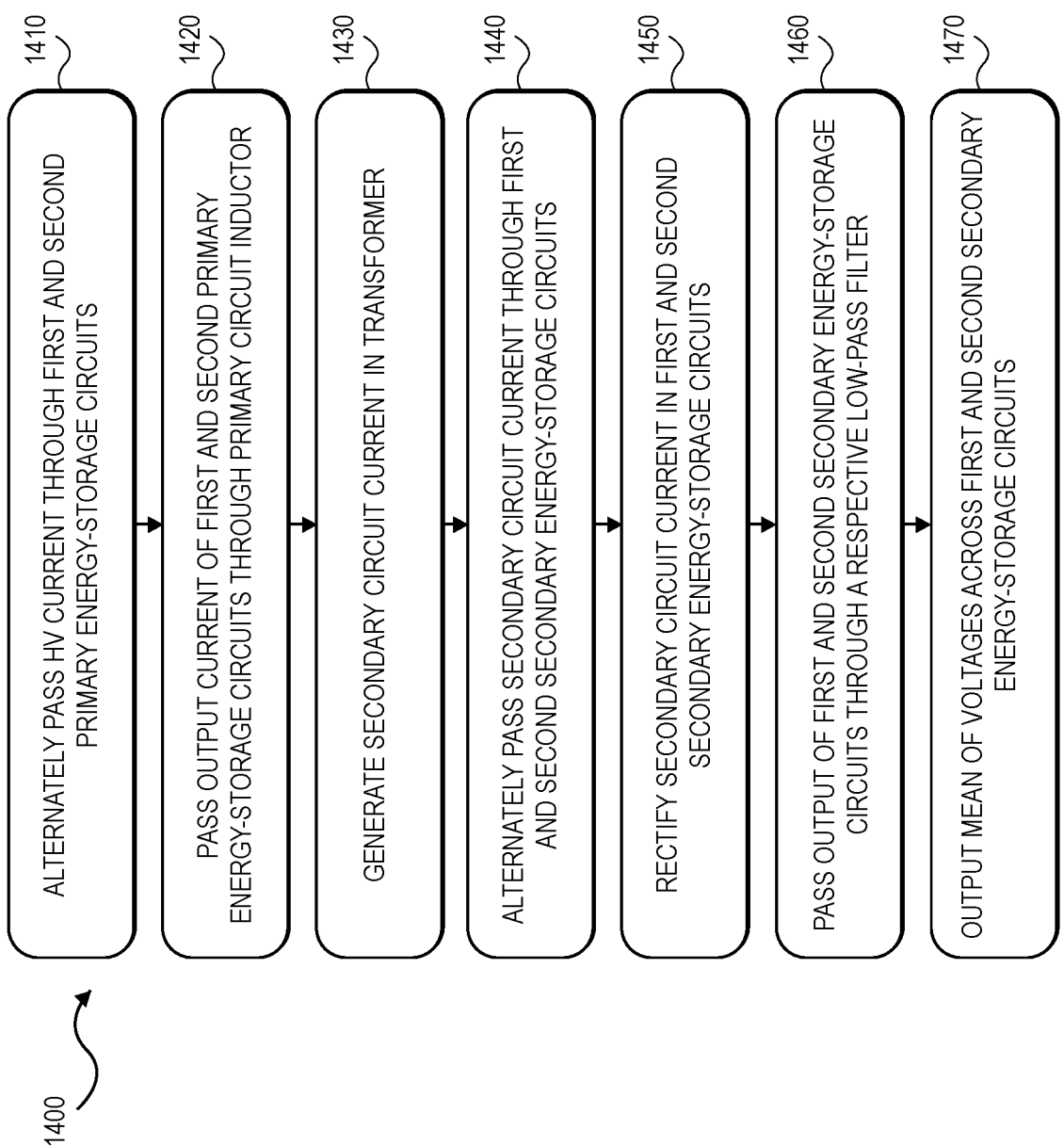
FIG. 14 is a flow chart of a method of converting power from a high voltage to a low voltage according to one or more embodiments.

FIG. 14 is a flow chart 1400 of a method of converting power from a high voltage to a low voltage according to one or more embodiments. In step 1410, current from a high-voltage source is alternately passed through a first primary energy-storage circuit and a second primary energy-storage circuit that is in parallel electrically with the first primary energy-storage circuit. Each of the first and second primary energy-storage circuits includes a respective resonant energy-storage device, such as an LC circuit (e.g., LC circuits 110, 120). In addition, each of the first and second primary energy-storage circuits includes a respective switch (e.g., first and second switches 130, 140). The output current of the first and second primary energy-storage circuits has an alternating current. Each switch in the respective first and second primary energy-storage circuits is operated at a frequency equal to the resonance frequency of the respective resonant energy-storage device (e.g., LC circuit). Each resonant energy-storage device has the same or about the same resonance frequency. The left and right primary switches can operate at a duty cycle about or approximately equal to 50%. The duty cycle of each switch can be adjusted to account for manufacturing variances between the resonance frequencies of the resonant energy-storage devices, in which case the switches can be operated at the average resonance frequency of the first and second primary energy-storage circuits.

In step 1420, the output current of the first and second primary energy-storage circuits passes through a primary circuit inductor in alternating directions. In step 1430, a secondary circuit current is generated in a transformer that comprises the primary circuit inductor and a secondary circuit inductor that are electromagnetically coupled to each other. The primary circuit inductor and the secondary circuit inductor can have an N:1 windings ratio to achieve a desired step-down voltage.

In step 1440, the secondary circuit current is alternately passed through the secondary circuit inductor in alternate directions (e.g., according to the direction that the current passes through primary circuit inductor). In some embodiments, the secondary circuit inductor is electrically in parallel with a secondary circuit capacitor to form a secondary LC circuit. Left and right terminals of the secondary circuit inductor are electrically coupled to left and right secondary switches, respectively, that operate approximately out of phase (e.g., one switch is in the open state when the other is in the closed state) at the frequency equal to the resonance frequency of the first and second primary energy-storage circuits. The left and right secondary switches can operate at a duty cycle about or approximately equal to 50%.

In step 1450, the secondary circuit inductor and the left and right secondary switches rectify the secondary circuit current. In step 1460, the rectified current output from the secondary circuit inductor is alternately passed through left and right low-pass filters based on the state of the left and right secondary switches. The low-pass filters output a mean of the rectified voltage output from the secondary circuit inductor in step 1470.

The duty cycles of the left and right primary switches can be adjusted (e.g., by a controller) so that the left primary switch is in phase with the left secondary switch and so that the right primary switch circuit is in phase with the right secondary switch, which can also provide zero-voltage switching for the left and right primary switches.

The invention should not be considered limited to the particular embodiments described above, but rather should be understood to cover all aspects of the invention as fairly set out in the attached claims. Various modifications, equivalent processes, as well as numerous structures to which the invention may be applicable, will be apparent to those skilled in the art to which the invention is directed upon review of this disclosure. The claims are intended to cover such modifications and equivalents.

What is claimed is:
1. A power converter comprising:
 a primary circuit comprising:
  a common node electrically coupled to a high-voltage source;
  a first primary LC circuit electrically coupled to the common node and to a first primary node;
  a second primary LC circuit electrically coupled to the common node and to a second primary node, the second primary LC circuit in parallel electrically with the first primary LC circuit, the first and second primary LC circuits having the same or about the same primary LC resonance frequency;
  a primary inductor having a first terminal electrically coupled to the first primary node and a second terminal electrically coupled to the second primary node;
  a first primary circuit switch electrically coupled to the first primary node, the first primary circuit switch having a closed state where the first primary switch is electrically coupled to the first primary node and to ground, the first primary circuit switch having an open state where the first primary circuit switch is electrically decoupled from the first primary node; and
  a second primary circuit switch electrically coupled to the second primary node, the second primary circuit switch having a closed state where the second primary switch is electrically coupled to the second primary node and to ground, the second primary circuit switch having an open state where the second primary circuit switch is electrically decoupled from the second primary node;
 a secondary circuit in electrical communication with the primary circuit, the secondary circuit comprising:

a secondary inductor electromagnetically coupled to the primary inductor to form a transformer;

a first secondary circuit switch electrically coupled to a first secondary inductor node, the first secondary node electrically coupled to a first terminal of the secondary inductor, the first secondary circuit switch having a closed state where the first secondary switch is electrically coupled to the first secondary node and to ground, the first secondary circuit switch having an open state where the first secondary circuit switch is electrically decoupled from the first secondary node;

a second secondary circuit switch electrically coupled to a second secondary inductor node, the second secondary node electrically coupled to a second terminal of the secondary inductor, the second secondary circuit switch having a closed state where the second secondary switch is electrically coupled to the second secondary node and to ground, the second secondary circuit switch having an open state where the second secondary circuit switch is electrically decoupled from the second secondary node;

a low-pass filter electrically coupled to the first and second secondary nodes;

a low-voltage output node electrically coupled to an output of the low-pass filter; and a controller in electrical communication with the first and second primary circuit switches and with the first and second secondary circuit switches, the controller configured to:

operate the first and second primary circuit switches at about the primary LC resonance frequency; and operate the first and second secondary circuit switches at about the primary LC resonance frequency, wherein the low-pass filter comprises:

a first low-pass filter electrically coupled to the low-voltage output node and the first secondary node; and a second low-pass filter electrically coupled to the low-voltage output node and the second secondary node.

2. The power converter of claim 1, wherein the controller includes a frequency-locked loop circuit that is locked to the primary LC resonance frequency.

3. The power converter of claim 1, wherein:
the first low-pass filter comprises a first LP inductor and a common output capacitor, and
the second low-pass filter comprises a second LP inductor and the common output capacitor.

4. The power converter of claim 1, wherein the first and second low-pass filters output a mean of a voltage at the first and second secondary nodes, respectively.

5. The power converter of claim 1, wherein the first and second primary LC circuits output an alternating current, the alternating current passing through the primary circuit inductor.

6. The power converter of claim 5, wherein the alternating current is received by the secondary circuit via the transformer.

7. The power converter of claim 6, wherein the first and second secondary switches rectify the alternating current.

8. The power converter of claim 1, wherein the controller includes a charge-sharing circuit that is electrically coupled to a charge-sharing switch, the charge-sharing switch electrically coupled to the first and second secondary circuit switches.

9. The power converter of claim 8, wherein:
the charge-sharing circuit is configured to close the charge-sharing switch to form an electrical path between the first and second secondary circuit switches, and
when the charge-sharing switch is closed, a charge in a parasitic gate capacitor of the first secondary circuit switch is used to partially charge a parasitic gate capacitor of the second secondary circuit switch.

10. The power converter of claim 1, further comprising a secondary circuit capacitor in parallel electrically with the secondary inductor to form a secondary LC circuit.

11. The power converter of claim 10, wherein the secondary circuit capacitor comprises a variable capacitor.

12. The power converter of claim 11, wherein:
the controller includes a voltage regulation circuit that compares an output voltage at the low-voltage output node with a reference voltage,
the voltage regulation circuit increases a capacitance of the variable capacitor when the output voltage is greater than the reference voltage, and
the voltage regulation circuit decreases a capacitance of the variable capacitor when the output voltage is less than the reference voltage.

13. The power converter of claim 12, wherein the controller includes a primary zero-voltage switching circuit that adjusts a duty cycle of the first and second primary circuit switches so that the first and second primary circuit switches are in phase with the first and second secondary circuit switches, respectively, when the capacitance of the variable capacitor is adjusted.

14. The power converter of claim 1, wherein the controller is configured to operate the first and second primary circuit switches at about a 50% duty cycle.

15. The power converter of claim 1, wherein the controller is configured to operate the first and second secondary circuit switches at about the 50% duty cycle.

16. A power converter comprising:
a primary circuit comprising:
a common node electrically coupled to a high-voltage source;
a first primary LC circuit electrically coupled to the common node and to a first primary node;
a second primary LC circuit electrically coupled to the common node and to a second primary node, the second primary LC circuit in parallel electrically with the first primary LC circuit, the first and second primary LC circuits having the same or about the same primary LC resonance frequency;
a primary inductor having a first terminal electrically coupled to the first primary node and a second terminal electrically coupled to the second primary node;
a first primary circuit switch electrically coupled to the first primary node, the first primary circuit switch having a closed state where the first primary switch is electrically coupled to the first primary node and to ground, the first primary circuit switch having an open state where the first primary circuit switch is electrically decoupled from the first primary node; and
a second primary circuit switch electrically coupled to the second primary node, the second primary circuit switch having a closed state where the second primary switch is electrically coupled to the second primary node and to ground, the second primary circuit switch having an open state where the second primary circuit switch is electrically decoupled from the second primary node;
a secondary circuit in electrical communication with the primary circuit, the secondary circuit comprising:
a secondary inductor electromagnetically coupled to the primary inductor to form a transformer;
a first secondary circuit switch electrically coupled to a first secondary inductor node, the first secondary node electrically coupled to a first terminal of the secondary inductor, the first secondary circuit switch having a closed state where the first secondary switch is electrically coupled to the first secondary node and to ground, the first secondary circuit switch having an open state where the first secondary circuit switch is electrically decoupled from the first secondary node;
a second secondary circuit switch electrically coupled to a second secondary inductor node, the second secondary node electrically coupled to a second terminal of the secondary inductor, the second secondary circuit switch having a closed state where the second secondary switch is electrically coupled to the second secondary node and to ground, the second secondary circuit switch having an open state where the second secondary circuit switch is electrically decoupled from the second secondary node;
a low-pass filter electrically coupled to the first and second secondary nodes;
a low-voltage output node electrically coupled to an output of the low-pass filter; and
a controller in electrical communication with the first and second primary circuit switches and with the first and second secondary circuit switches, the controller configured to:
operate the first and second primary circuit switches at about the primary LC resonance frequency; and
operate the first and second secondary circuit switches at about the primary LC resonance frequency,
wherein the controller includes a charge-sharing circuit that is electrically coupled to a charge-sharing switch, the charge-sharing switch electrically coupled to the first and second secondary circuit switches.

17. The power converter of claim 16, wherein the controller includes a frequency-locked loop circuit that is locked to the primary LC resonance frequency.

18. The power converter of claim 16, wherein the low-pass filter comprises:
a first low-pass filter electrically coupled to the low-voltage output node and the first secondary node; and
a second low-pass filter electrically coupled to the low-voltage output node and the second secondary node.

19. The power converter of claim 18, wherein:
the first low-pass filter comprises a first LP inductor and a common output capacitor, and
the second low-pass filter comprises a second LP inductor and the common output capacitor.

20. The power converter of claim 18, wherein the first and second low-pass filters output a mean of a voltage at the first and second secondary nodes, respectively.

21. The power converter of claim 16, wherein the first and second primary LC circuits output an alternating current, the alternating current passing through the primary circuit inductor.

22. The power converter of claim 21, wherein the alternating current is received by the secondary circuit via the transformer.

23. The power converter of claim 22, wherein the first and second secondary switches rectify the alternating current.

24. The power converter of claim 16, wherein:
the charge-sharing circuit is configured to close the charge-sharing switch to form an electrical path between the first and second secondary circuit switches, and
when the charge-sharing switch is closed, a charge in a parasitic gate capacitor of the first secondary circuit switch is used to partially charge a parasitic gate capacitor of the second secondary circuit switch.

25. The power converter of claim 16, further comprising a secondary circuit capacitor in parallel electrically with the secondary inductor to form a secondary LC circuit.

26. The power converter of claim 25, wherein the secondary circuit capacitor comprises a variable capacitor.

27. The power converter of claim 26, wherein:
the controller includes a voltage regulation circuit that compares an output voltage at the low-voltage output node with a reference voltage,
the voltage regulation circuit increases a capacitance of the variable capacitor when the output voltage is greater than the reference voltage, and
the voltage regulation circuit decreases a capacitance of the variable capacitor when the output voltage is less than the reference voltage.

28. The power converter of claim 27, wherein the controller includes a primary zero-voltage switching circuit that adjusts a duty cycle of the first and second primary circuit switches so that the first and second primary circuit switches are in phase with the first and second secondary circuit switches, respectively, when the capacitance of the variable capacitor is adjusted.

29. The power converter of claim 16, wherein the controller is configured to operate the first and second primary circuit switches at about a 50% duty cycle.

30. The power converter of claim 16, wherein the controller is configured to operate the first and second secondary circuit switches at about the 50% duty cycle.

31. A power converter comprising:
a primary circuit comprising:
a common node electrically coupled to a high-voltage source;
a first primary LC circuit electrically coupled to the common node and to a first primary node;
a second primary LC circuit electrically coupled to the common node and to a second primary node, the second primary LC circuit in parallel electrically with the first primary LC circuit, the first and second primary LC circuits having the same or about the same primary LC resonance frequency;
a primary inductor having a first terminal electrically coupled to the first primary node and a second terminal electrically coupled to the second primary node;
a first primary circuit switch electrically coupled to the first primary node, the first primary circuit switch having a closed state where the first primary switch is electrically coupled to the first primary node and to ground, the first primary circuit switch having an open state where the first primary circuit switch is electrically decoupled from the first primary node; and a second primary circuit switch electrically coupled to the second primary node, the second primary circuit switch having a closed state where the second primary switch is electrically coupled to the second primary node and to ground, the second primary circuit switch having an open state where the second primary circuit switch is electrically decoupled from the second primary node;

a secondary circuit in electrical communication with the primary circuit, the secondary circuit comprising:
    a secondary inductor electromagnetically coupled to the primary inductor to form a transformer;
    a secondary circuit capacitor in parallel electrically with the secondary inductor to form a secondary LC circuit, the secondary circuit capacitor comprising a variable capacitor;
    a first secondary circuit switch electrically coupled to a first secondary inductor node, the first secondary node electrically coupled to a first terminal of the secondary inductor, the first secondary circuit switch having a closed state where the first secondary switch is electrically coupled to the first secondary node and to ground, the first secondary circuit switch having an open state where the first secondary circuit switch is electrically decoupled from the first secondary node;
    a second secondary circuit switch electrically coupled to a second secondary inductor node, the second secondary node electrically coupled to a second terminal of the secondary inductor, the second secondary circuit switch having a closed state where the second secondary switch is electrically coupled to the second secondary node and to ground, the second secondary circuit switch having an open state where the second secondary circuit switch is electrically decoupled from the second secondary node;

a low-pass filter electrically coupled to the first and second secondary nodes;
a low-voltage output node electrically coupled to an output of the low-pass filter; and
a controller in electrical communication with the first and second primary circuit switches and with the first and second secondary circuit switches, the controller configured to:
    operate the first and second primary circuit switches at about the primary LC resonance frequency; and
    operate the first and second secondary circuit switches at about the primary LC resonance frequency,
wherein:
    the controller includes a voltage regulation circuit that compares an output voltage at the low-voltage output node with a reference voltage,
    the voltage regulation circuit increases a capacitance of the variable capacitor when the output voltage is greater than the reference voltage,
    the voltage regulation circuit decreases a capacitance of the variable capacitor when the output voltage is less than the reference voltage, and
    the controller includes a primary zero-voltage switching circuit that adjusts a duty cycle of the first and second primary circuit switches so that the first and second primary circuit switches are in phase with the first and second secondary circuit switches, respectively, when the capacitance of the variable capacitor is adjusted.

\* \* \* \* \*